(12) United States Patent
Inoue et al.

(10) Patent No.: US 10,539,229 B2
(45) Date of Patent: Jan. 21, 2020

(54) CONTROL APPARATUS FOR POWER TRANSMISSION SYSTEM

(71) Applicant: TOYOTA JIDOSHA KABUSHIKI KAISHA, Toyota-shi, Aichi-ken (JP)

(72) Inventors: Daisuke Inoue, Toyota (JP); Akihide Ito, Nagoya (JP); Kazuya Sakamoto, Toyota (JP); Hiroki Kondo, Miyoshi (JP); Mitsuhiro Fukao, Toyota (JP); Kenji Matsuo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 292 days.

(21) Appl. No.: 15/526,425

(22) PCT Filed: Nov. 17, 2015

(86) PCT No.: PCT/IB2015/002161
§ 371 (c)(1),
(2) Date: May 12, 2017

(87) PCT Pub. No.: WO2016/079583
PCT Pub. Date: May 26, 2016

(65) Prior Publication Data
US 2017/0314672 A1    Nov. 2, 2017

(30) Foreign Application Priority Data

Nov. 21, 2014 (JP) ................. 2014-237136

(51) Int. Cl.
*F16H 61/04* (2006.01)
*F16H 61/70* (2006.01)
(Continued)

(52) U.S. Cl.
CPC ......... *F16H 61/0403* (2013.01); *F16H 61/04* (2013.01); *F16H 61/702* (2013.01);
(Continued)

(58) Field of Classification Search
CPC .... F16H 61/04; F16H 61/0403; F16H 61/702; F16H 2061/022; F16H 2061/0407;
(Continued)

(56) References Cited

U.S. PATENT DOCUMENTS

2011/0284335 A1   11/2011   Arnold et al.
2014/0288791 A1*   9/2014   Iizuka ............... B60W 10/06
                                                           701/54
(Continued)

FOREIGN PATENT DOCUMENTS

EP          1 669 270 A2    6/2006
WO      2013/176208 A1   11/2013

*Primary Examiner* — Jacob S. Scott
*Assistant Examiner* — Lori Wu
(74) *Attorney, Agent, or Firm* — Oliff PLC

(57) ABSTRACT

An engagement operation of a dog clutch is carried out while an engagement operation of a second clutch is being carried out, that is, during a situation that an uplock is hard to occur because of a phase shift generated between meshing counterpart members of the dog clutch. Thus, the dog clutch is easily engaged, and it is possible to facilitate preparation for transmission of power through a first power transmission path. If the dog clutch is not engaged, the second clutch is engaged and a second power transmission path is established, so it is possible to start moving a vehicle by transmitting power through the second power transmission path. Thus, when the dog clutch is in a non-engaged state at the time of an N-to-D shift during a stop of the vehicle, it is possible to ensure the startability of the vehicle.

9 Claims, 9 Drawing Sheets

(51) Int. Cl.
*F16H 37/02* (2006.01)
*F16H 37/08* (2006.01)

(52) U.S. Cl.
CPC ........ *F16H 37/022* (2013.01); *F16H 37/0846* (2013.01); *F16H 2061/0407* (2013.01); *F16H 2061/0474* (2013.01); *F16H 2061/0488* (2013.01); *F16H 2312/022* (2013.01)

(58) Field of Classification Search
CPC ......... F16H 2061/04743; F16H 37/055; F16H 37/0846; F16H 2312/022
See application file for complete search history.

(56) References Cited

U.S. PATENT DOCUMENTS

| | | | |
|---|---|---|---|
| 2015/0087463 A1 | 3/2015 | Nakagawa et al. | |
| 2015/0127242 A1* | 5/2015 | Iizuka | F16H 61/02 |
| | | | 701/110 |
| 2015/0133257 A1* | 5/2015 | Uchino | F16H 37/022 |
| | | | 475/210 |
| 2016/0186846 A1* | 6/2016 | Kidokoro | F16H 37/022 |
| | | | 474/8 |

* cited by examiner

CONTROL APPARATUS FOR POWER TRANSMISSION SYSTEM

BACKGROUND OF THE INVENTION

1. Field of the Invention

The invention relates to a control apparatus for a power transmission system including a plurality of power transmission paths provided in parallel with each other between a driving force source and a drive wheel.

2. Description of Related Art

There is well known a power transmission system including a plurality of power transmission paths. The plurality of power transmission paths are provided in parallel with each other between an input rotating member and an output rotating member. Power of a driving force source is transmitted to the input rotating member. The output rotating member outputs the power to a drive wheel. This is, for example, a power transmission system for a vehicle, described in International Application Publication No. 2013/176208. International Application Publication No. 2013/176208 describes the power transmission system for a vehicle, including a power transmission path through a continuously variable transmission and a power transmission path through a gear train. The power transmission paths are provided in parallel with each other between an input shaft and an output shaft. In this power transmission system for a vehicle, when an intermesh clutch and a first clutch mechanism provided on the input shaft side with respect to the intermesh clutch are engaged, the power transmission path through the gear train is established. When a second clutch mechanism is engaged, the power transmission path through the continuously variable transmission is established. A speed ratio that is established by the power transmission path through the gear train is set to a value larger (that is, lower) than the lowest vehicle speed-side speed ratio (that is, maximum speed ratio) that is established by the power transmission path through the continuously variable transmission. Therefore, for example, when the vehicle starts moving, the power transmission path through the gear train is established (selected) by engaging the first clutch mechanism and the intermesh clutch, with the result that a large driving force is allowed to be generated in the vehicle.

Incidentally, in the power transmission system for a vehicle, described in International Application Publication No. 2013/176208, during a stop of the vehicle, it is desirable to establish the power transmission path through the gear train in advance in preparation for a start of the vehicle. For example, when an N-to-D shift for changing a shift position of a shift operating member from a neutral position to a forward drive position is performed during a stop of the vehicle while the driving force source is being operated, the power transmission path through the gear train is established. At this time, because of the structure of the intermesh clutch, when there is relative rotation between input and output elements, the intermesh clutch may not be engaged because of the fact that input-side and output-side teeth provided in the intermesh clutch reject each other. In this way, there is a case where the intermesh clutch may not be engaged in a state where the first clutch mechanism is engaged. For this reason, it is required to establish the power transmission path through the gear train by engaging the first clutch mechanism in a state where the intermesh clutch is engaged. Therefore, when the intermesh clutch is not engaged, the intermesh clutch is engaged in advance of engagement of the first clutch mechanism. However, depending on the phases of counterpart members (for example, spline teeth) that mesh at the time of engagement of the intermesh clutch in a state where rotation of the input and output elements of the intermesh clutch is stopped, there is a possibility that an engagement fault (uplock) of the intermesh clutch occurs. The engagement fault (uplock) is such a fault that an engagement operation of the intermesh clutch does not proceed and, as a result, the intermesh clutch is not engaged. If such an uplock occurs, the power transmission path through the gear train is not established, so it is disadvantageous in the startability of the vehicle. The above-described inconvenience is not publicly known.

SUMMARY OF THE INVENTION

The invention provides a control apparatus for a power transmission system, which is able to ensure the startability of a vehicle when an intermesh clutch is in a non-engaged state at the time of an N-to-D shift during a stop of the vehicle.

An aspect of the invention provides a control apparatus for a power transmission system including at least a first power transmission path and a second power transmission path. The first power transmission path and the second power transmission path are provided in parallel with each other between an input rotating member, to which power of a driving force source is transmitted, and an output rotating member that outputs the power to a drive wheel. The first power transmission path is established when an intermesh clutch and a first friction clutch provided on the input rotating member side with respect to the intermesh clutch are engaged. The second power transmission path is established when a second friction clutch is engaged. The control apparatus includes an electronic control unit. The electronic control unit is configured to: during a stop of a vehicle while the driving force source is being driven, when the intermesh clutch is in a non-engaged state at the time when a shift position of a shift operating member is changed from a neutral position to a forward drive position, (i) start an engagement operation of the second friction clutch while the first friction clutch is in a non-engaged state, and (ii) carry out an engagement operation of the intermesh clutch while the engagement operation of the second friction clutch is being carried out.

With the above-described control apparatus, when the second friction clutch is engaged, torque is applied to the output rotating member of the power transmission system, and the output rotating member is twisted. When the output rotating member is twisted, the output element of the intermesh clutch is rotated in correspondence with the twisted amount. At this time, because both the first friction clutch and the intermesh clutch are released, the input element of the intermesh clutch remains in a rotation stopped state. Therefore, differential rotation (phase shift) is generated between the input and output elements (counterpart members that mesh at the time of engagement) of the intermesh clutch. The engagement operation of the intermesh clutch is carried out while the engagement operation of the second friction clutch is being carried out, that is, during a situation that an uplock is hindered because of the phase shift generated between the meshing counterpart members of the intermesh clutch. Thus, the intermesh clutch is easily engaged, and it is possible to facilitate preparation for transmission of power through the first power transmission path. If the intermesh clutch is not engaged, the second friction clutch is engaged and the second power transmission path is established, so it is possible to start moving the vehicle by transmitting power through the second power transmission path. Thus, when the intermesh clutch is in a non-engaged state (that is, when preparation for transmission of power through the first power transmission path has not completed) at the time of the N-to-D shift during a stop of the vehicle, it is possible to ensure the startability of the vehicle.

In the control apparatus, the electronic control unit may be configured to: when engagement of the intermesh clutch has completed while the engagement operation of the second friction clutch is being carried out, (i) release the second friction clutch, and (ii) engage the first friction clutch. With this configuration, it is possible to start moving the vehicle by transmitting power through the first power transmission path. For example, when a speed ratio that is established by the first power transmission path is set to a value larger than a maximum speed ratio that is established by the second power transmission path, it is possible to start moving the vehicle by transmitting power through the first power transmission path that establishes a relatively large speed ratio, so it is possible to further ensure the startability of the vehicle.

In the control apparatus, the electronic control unit may be configured to: (i) start an engagement operation of the first friction clutch while the engagement operation of the second friction clutch is being carried out, and (ii) keep the first friction clutch in a predetermined state where the first friction clutch has no torque capacity. With this configuration, the power transmission path is quickly changed from the second power transmission path to the first power transmission path by releasing the second friction clutch and engaging the first friction clutch.

In the control apparatus, the electronic control unit may be configured to, when engagement of the second friction clutch has completed before reaching the predetermined state where the first friction clutch has no torque capacity, keep the engagement of the second friction clutch while the first friction clutch is in the non-engaged state. With this configuration, after the second power transmission path has been established, no change of the power transmission path from the second power transmission path to the first power transmission path is carried out, so it is possible to reduce or eliminate a delay of ensuring the startability of the vehicle.

In the control apparatus, the electronic control unit may be configured to, when reaching a predetermined state where the second friction clutch has no torque capacity while the engagement operation of the second friction clutch is being carried out, start the engagement operation of the first friction clutch. There is a possibility that, when the engagement operation of the second friction clutch and the engagement operation of the first friction clutch are started substantially at the same timing, it takes time until reaching the predetermined state where the second friction clutch has no torque capacity and, as a result, establishment of the second power transmission path delays. In contrast, with the above configuration, the engagement operation of the first friction clutch is started after reaching the predetermined state where the second friction clutch has no torque capacity, so the second friction clutch is quickly placed in the predetermined state where the second friction clutch has no torque capacity.

In the control apparatus, the electronic control unit may be configured to: when engagement of the intermesh clutch has completed before reaching a predetermined state where the second friction clutch has no torque capacity while the engagement operation of the second friction clutch is being carried out, (i) release the second friction clutch, and (ii) engage the first friction clutch. With this configuration, it is just required to release the second friction clutch having no torque capacity and engage the first friction clutch, so it is possible to reduce the frequency of changing the engaged clutch, which is difficult control for engaging the first friction clutch while releasing the second friction clutch having a torque capacity.

In the control apparatus, the electronic control unit may be configured to, when the engagement operation of the second friction clutch has been started, carry out the engagement operation of the second friction clutch at least until reaching a predetermined state where the second friction clutch has no torque capacity. With this configuration, the second friction clutch is definitely placed in the predetermined state where the second friction clutch has no torque capacity, and, after the second friction clutch is placed in the predetermined state, the second friction clutch is engaged or the engaged clutch is changed by releasing the second friction clutch and engaging the first friction clutch. Therefore, it is possible to suppress a time from the N-to-D shift to establishment of the second power transmission path or first power transmission path.

In the control apparatus, the electronic control unit may be configured to, when engagement of the second friction clutch has completed before engagement of the intermesh clutch completes, keep the engagement of the second friction clutch while the first friction clutch is in the non-engaged state. With this configuration, after the second power transmission path has been established, no change of the power transmission path from the second power transmission path to the first power transmission path is carried out, so it is possible to suppress a delay of ensuring the startability of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
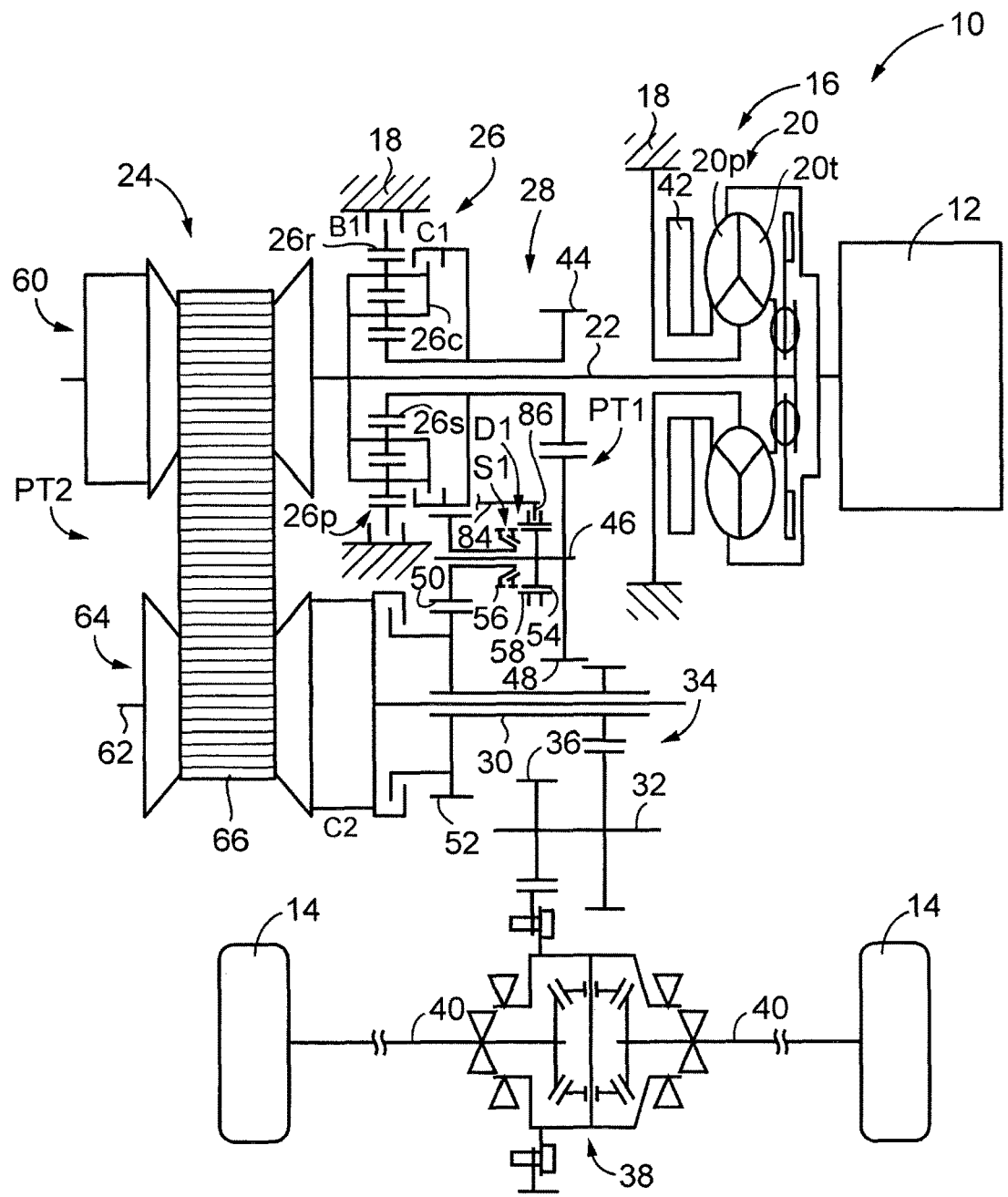
FIG. 1 is a view that illustrates the schematic configuration of a vehicle to which a control apparatus for a power transmission system according to first and second embodiments of the invention is applied.

Hereinafter, an embodiment of the invention will be described in detail with reference to the accompanying drawings. FIG. 1 is a view that illustrates the schematic configuration of a vehicle 10 to which the invention is applied. As shown in FIG. 1, the vehicle 10 includes an engine 12, drive wheels 14 and a power transmission system 16. The engine 12 functions as a driving force source for propelling the vehicle 10. The engine 12 is, for example, a gasoline engine or a diesel engine. The power transmission system 16 is provided between the engine 12 and the drive wheels 14. The power transmission system 16 includes a known torque converter 20, an input shaft 22, a known belt-type continuously variable transmission 24 (hereinafter, referred to as continuously variable transmission 24), a forward/reverse switching device 26, a gear mechanism 28, an output shaft 30, a counter shaft 32, a reduction gear unit 34, a differential gear set 38, a pair of axles 40, and the like. The torque converter 20 serves as a fluid transmission device coupled to the engine 12 in a housing 18 that serves as a non-rotating member. The input shaft 22 is coupled to the torque converter 20. The continuously variable transmission 24 is coupled to the input shaft 22. The continuously variable transmission 24 serves as a continuously variable transmission mechanism. The forward/reverse switching device 26 is also coupled to the input shaft 22. The gear mechanism 28 is coupled to the input shaft 22 via the forward/reverse switching device 26. The gear mechanism 28 is provided in parallel with the continuously variable transmission 24. The output shaft 30 is an output rotating member common to the continuously variable transmission 24 and the gear mechanism 28. The reduction gear unit 34 is formed of a pair of gears. The pair of gears are respectively provided on the output shaft 30 and the counter shaft 32 so as to be relatively non-rotatable, and are in mesh with each other. The differential gear set 38 is coupled to a gear 36. The gear 36 is provided on the counter shaft 32 so as to be relatively non-rotatable. The pair of axles 40 are coupled to the differential gear set 38. In the thus configured power transmission system 16, the power of the engine 12 (when not specifically distinguished from one another, power is synonymous with torque and force) is transmitted from the torque converter 20 to the continuously variable transmission 24 or from the forward/reverse switching device 26 to the gear mechanism 28 and then to the pair of drive wheels 14 sequentially via the reduction gear unit 34, the differential gear set 38, the axles 40, and the like.

In this way, the power transmission system 16 includes a plurality of power transmission paths PT. The plurality of power transmission paths PT are provided in parallel with each other between the engine 12 (which is synonymous with the input shaft 22 that is an input rotating member to which the power of the engine 12 is transmitted) and the drive wheels 14 (which are synonymous with the output shaft 30 that is an output rotating member that outputs the power of the engine 12 to the drive wheels 14). The plurality of power transmission paths PT include a first power transmission path PT1 and a second power transmission path PT2. The first power transmission path PT1 transmits the power of the engine 12 from the input shaft 22 to the drive wheels 14 side (that is, the output shaft 30) via the gear mechanism 28. The second power transmission path PT2 transmits the power of the engine 12 from the input shaft 22 to the drive wheels 14 side (that is, the output shaft 30) via the continuously variable transmission 24. The power transmission system 16 is configured to change the power transmission path between the first power transmission path PT1 and the second power transmission path PT2 on the basis of a traveling state of the vehicle 10. Therefore, the power transmission system 16 includes clutch mechanisms that selectively change the power transmission path PT, which transmits the power of the engine 12 to the drive wheels 14 side, between the first power transmission path PT1 and the second power transmission path PT2. The clutch mechanisms include a first friction clutch and a second friction clutch. The first friction clutch is a friction clutch that connects or interrupts the first power transmission path PT1 (in other words, a friction clutch that establishes the first power transmission path PT1 when engaged). The first friction clutch includes a first clutch C1 and a first brake B1. The second friction clutch is a friction clutch that connects or interrupts the second power transmission path PT2 (in other words, a friction clutch that establishes the second power transmission path PT2 when engaged). The second friction clutch includes a second clutch C2. The first clutch C1, the first brake B1 and the second clutch C2 correspond to a separating device. Each of the first clutch C1, the first brake B1 and the second clutch C2 is a known hydraulic friction engagement device (friction clutch) that is frictionally engaged by a hydraulic actuator. Each of the first clutch C1 and the first brake B1 is one of elements that constitute the forward/reverse switching device 26, as will be described later.

The torque converter 20 is provided around the input shaft 22 coaxially with the input shaft 22. The torque converter 20 includes a pump impeller 20p and a turbine runner 20t. The pump impeller 20p is coupled to the engine 12. The turbine runner 20t is coupled to the input shaft 22. A mechanical oil pump 42 is coupled to the pump impeller 20p. The oil pump 42 generates hydraulic pressure when driven by the engine 12 to rotate. The hydraulic pressure is used to control a shift of the continuously variable transmission 24, actuate the clutch mechanisms or supply lubricating oil to portions of the power transmission system 16.

The forward/reverse switching device 26 is provided around the input shaft 22 coaxially with the input shaft 22 in the first power transmission path PT1. The forward/reverse switching device 26 includes a double-pinion-type planetary gear train 26p, the first clutch C1 and the first brake B1. The planetary gear train 26p is a differential mechanism including three rotating elements, that is, a carrier 26c, a sun gear 26s and a ring gear 26r. The carrier 26c serves as an input element. The sun gear 26s serves as an output element. The ring gear 26r serves as a reaction element. The carrier 26c is integrally coupled to the input shaft 22. The ring gear 26r is selectively coupled to the housing 18 via the first brake B1. The sun gear 26s is coupled to a small-diameter gear 44. The small-diameter gear 44 is provided around the input shaft 22 coaxially with the input shaft 22 so as to be relatively rotatable. The carrier 26c and the sun gear 26s are selectively coupled to each other via the first clutch C1. Thus, the first clutch C1 is the clutch mechanism that selectively couples two of the three rotating elements to each other. The first brake B1 is the clutch mechanism that selectively couples the reaction element to the housing 18.

The gear mechanism 28 includes the small-diameter gear 44 and a large-diameter gear 48. The large-diameter gear 48 is provided around a gear mechanism counter shaft 46 coaxially with the gear mechanism counter shaft 46 so as to be relatively non-rotatable. The large-diameter gear 48 is in mesh with the small-diameter gear 44. The gear mechanism 28 includes an idler gear 50 and an output gear 52. The idler gear 50 is provided around the gear mechanism counter shaft 46 coaxially with the gear mechanism counter shaft 46 so as to be relatively rotatable. The output gear 52 is provided around the output shaft 30 coaxially with the output shaft 30 so as to be relatively non-rotatable. The output gear 52 is in mesh with the idler gear 50. The output gear 52 has a larger diameter than the idler gear 50. Therefore, the gear mechanism 28 is the gear mechanism having a speed ratio (speed stage) as a predetermined speed ratio (speed stage) in the power transmission path PT between the input shaft 22 and the output shaft 30. A dog clutch D1 that serves as an intermesh clutch is further provided around the gear mechanism counter shaft 46 between the large-diameter gear 48 and the idler gear 50. The dog clutch D1 selectively connects the large-diameter gear 48 to the idler gear 50 or disconnects the large-diameter gear 48 from the idler gear 50. The dog clutch D1 functions as a third clutch that connects or interrupts the first power transmission path PT1 (in other words, the third clutch that establishes the first power transmission path PT1 when engaged together with the first friction clutch). The dog clutch D1 is included in the clutch mechanisms. The third clutch is presumably provided in the power transmission system 16 and is arranged in the power transmission path between the forward/reverse switching device 26 (which is synonymous with the first friction clutch) and the output shaft 30.

Specifically, the dog clutch D1 includes a clutch hub 54, a clutch gear 56 and a cylindrical sleeve 58. The clutch hub 54 is provided around the gear mechanism counter shaft 46 coaxially with the gear mechanism counter shaft 46 so as to be relatively non-rotatable. The clutch gear 56 is arranged between the idler gear 50 and the clutch hub 54, and is fixed to the idler gear 50. The sleeve 58 is spline-fitted to the clutch hub 54. Thus, the sleeve 58 is provided so as to be relatively non-rotatable around the axis of the gear mechanism counter shaft 46 and relatively movable in a direction parallel to the axis. When the sleeve 58 that is constantly rotated integrally with the clutch hub 54 is moved toward the clutch gear 56 and is meshed with the clutch gear 56, the idler gear 50 and the gear mechanism counter shaft 46 are connected to each other. The dog clutch D1 includes a known synchromesh mechanism S1 that serves as a synchronization mechanism. The synchromesh mechanism S1 synchronizes rotations at the time of fitting the sleeve 58 to the clutch gear 56. In the thus configured dog clutch D1, the sleeve 58 is slidably moved in a direction parallel to the axis of the gear mechanism counter shaft 46. Thus, the dog clutch D1 is changed between an engaged state and a released state.

The first power transmission path PT1 is established when the dog clutch D1 and the first clutch C1 (or the first brake B1) provided on the input shaft 22 side with respect to the dog clutch D1 both are engaged. When the first clutch C1 is engaged, a forward power transmission path is established. When the first brake B1 is engaged, a reverse power transmission path is established. When the first power transmission path PT1 is established, the power transmission system 16 is set to a power transmittable state where the power of the engine 12 is allowed to be transmitted from the input shaft 22 to the output shaft 30 via the gear mechanism 28. On the other hand, when at least both the first clutch C1 and the first brake B1 are released or at least the dog clutch D1 is released, the first power transmission path PT1 is set to a neutral state (power transmission interrupted state) where transmission of power is interrupted.

The continuously variable transmission 24 includes a primary pulley 60, a secondary pulley 64 and a transmission belt 66. The primary pulley 60 is provided on the input shaft 22, and has a variable effective diameter. The secondary pulley 64 is provided on a rotary shaft 62 coaxial with the output shaft 30, and has a variable effective diameter. The transmission belt 66 is wound around the primary pulley 60 and the secondary pulley 64 so as to span between the primary pulley 60 and the secondary pulley 64. Power is transmitted via a friction force between the pair of pulleys 60, 64 and the transmission belt 66. In the continuously variable transmission 24, when the winding diameter (effective diameter) of the transmission belt 66 is changed as a result of a change in the V-groove width of each of the pair of pulleys 60, 64, a speed ratio γ (=Primary pulley rotation speed Npri/Secondary pulley rotation speed Nsec) is changed. The output shaft 30 is arranged around the rotary shaft 62 so as to be relatively rotatable coaxially with the rotary shaft 62. The second clutch C2 is provided on the drive wheels 14 side with respect to the continuously variable transmission 24. That is, the second clutch C2 is provided between the secondary pulley 64 and the output shaft 30. The second clutch C2 selectively connects the secondary pulley 64 (rotary shaft 62) to the output shaft 30 or disconnects the secondary pulley 64 (rotary shaft 62) from the output shaft 30. The second power transmission path PT2 is established when the second clutch C2 is engaged. When the second power transmission path PT2 is established, the power transmission system 16 is set to a power transmittable state where the power of the engine 12 is allowed to be transmitted from the input shaft 22 to the output shaft 30 via the continuously variable transmission 24. On the other hand, the second power transmission path PT2 is set to a neutral state when the second clutch C2 is released.

Figure 2:
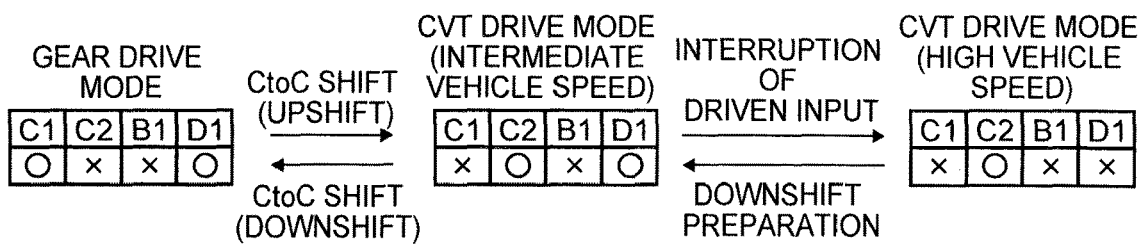
FIG. 2 is a view for illustrating changes in driving pattern of a power transmission system shown in FIG. 1.

The operation of the power transmission system 16 will be described below. FIG. 2 is a view for illustrating changes in driving pattern (drive mode) of the power transmission system 16 by using an engagement chart of engagement elements for each driving pattern. In FIG. 2, C1 corresponds to the operation state of the first clutch C1, C2 corresponds to the operation state of the second clutch C2, B1 corresponds to the operation state of the first brake B1, D1 corresponds to the operation state of the dog clutch D1, "O" indicates an engaged (connected) state, and "x" indicates a released (disconnected) state.

In FIG. 2, for example, in the driving pattern of the gear drive mode in which the first clutch C1 and the dog clutch D1 are engaged and the second clutch C2 and the first brake B1 are released, the power of the engine 12 is transmitted to the output shaft 30 via the first power transmission path PT1, and forward traveling is enabled. In the driving pattern of the gear drive mode in which, for example, the first brake B1 and the dog clutch D1 are engaged and the second clutch C2 and the first clutch C1 are released, reverse traveling is enabled.

For example, in the driving pattern of the CVT drive mode (high vehicle speed) in which, for example, the second clutch C2 is engaged and the first clutch C1, the first brake B1 and the dog clutch D1 are released, the power of the engine 12 is transmitted to the output shaft 30 via the second power transmission path PT2, and forward traveling is enabled. The reason why the dog clutch D1 is released in the CVT drive mode (high vehicle speed) is to, for example, eliminate a drag of the gear mechanism 28, and the like, in the CVT drive mode and prevent high-speed rotation of the gear mechanism 28, the constituent members (for example, pinion gears) of the planetary gear train $26p$, and the like, at a high vehicle speed. The dog clutch D1 functions as a driven input interrupting clutch that interrupts an input from the drive wheels 14 side.

The gear drive mode is, for example, selected in a low vehicle speed region including a state during a stop of the vehicle. In the power transmission system 16, a speed ratio $\gamma 1$ that is established by the first power transmission path PT1 is set to a value larger than (that is, a speed ratio lower than) the lowest vehicle speed-side speed ratio (lowest speed ratio) (that is, the maximum speed ratio) $\gamma max$ that can be established by the second power transmission path PT2. For example, the speed ratio $\gamma 1$ corresponds to a first-speed speed ratio in the power transmission system 16, and the maximum speed ratio $\gamma max$ corresponds to a second-speed speed ratio in the power transmission system 16. Therefore, for example, the gear drive mode and the CVT drive mode are changed in accordance with a shift line for changing the speed stage between the first speed stage and the second speed stage in a shift map of a known stepped transmission. In the CVT drive mode, the continuously variable transmission 24 is shifted on the basis of a traveling state, such as an accelerator operation amount and a vehicle speed, by using, for example, a known technique such that the speed ratio $\gamma$ is changed between the maximum speed ratio $\gamma max$ and the maximum vehicle speed-side (highest-side) speed ratio (that is, the minimum speed ratio) $\gamma min$.

In changing the driving pattern from the gear drive mode to the CVT drive mode (high vehicle speed) or changing the driving pattern from the CVT drive mode (high vehicle speed) to the gear drive mode, the change is carried out via the driving pattern of a CVT drive mode (intermediate vehicle speed) as shown in FIG. 2 transitionally. In the driving pattern of the CVT drive mode (intermediate vehicle speed), the dog clutch D1 is further engaged in the CVT drive mode (high vehicle speed). For example, when the driving pattern is changed from the gear drive mode to the CVT drive mode (high vehicle speed), the driving pattern is transitionally changed to the CVT drive mode (intermediate vehicle speed) by carrying out a shift for changing the engaged clutch (for example, clutch-to-clutch shift (hereinafter, referred to as CtoC shift)) so as to release the first clutch C1 and engage the second clutch C2. After that, the dog clutch D1 is released. For example, when the driving pattern is changed from the CVT drive mode (high vehicle speed) to the gear drive mode, the driving pattern is transitionally changed to the CVT drive mode (intermediate vehicle speed) by engaging the dog clutch D1 in preparation for changing the driving pattern to the gear drive mode. After that, a shift for changing the engaged clutch (for example, CtoC shift) is carried out so as to release the second clutch C2 and engage the first clutch C1.

Figure 3:
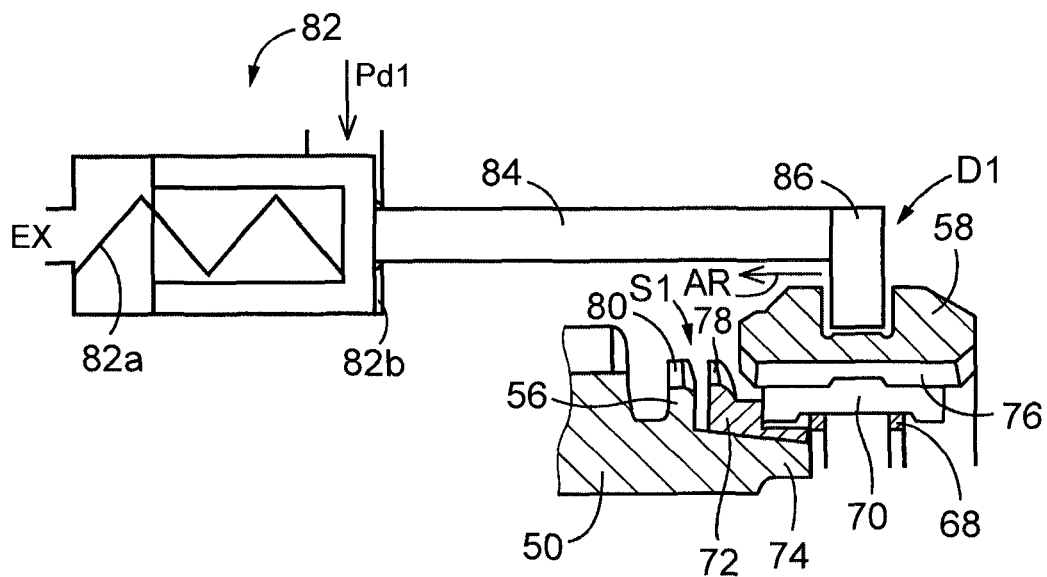
FIG. 3 is a view for illustrating how an intermesh clutch shown in FIG. 1 is changed between an engaged state and a released state, and shows a state where the intermesh clutch is released.
Figure 4:
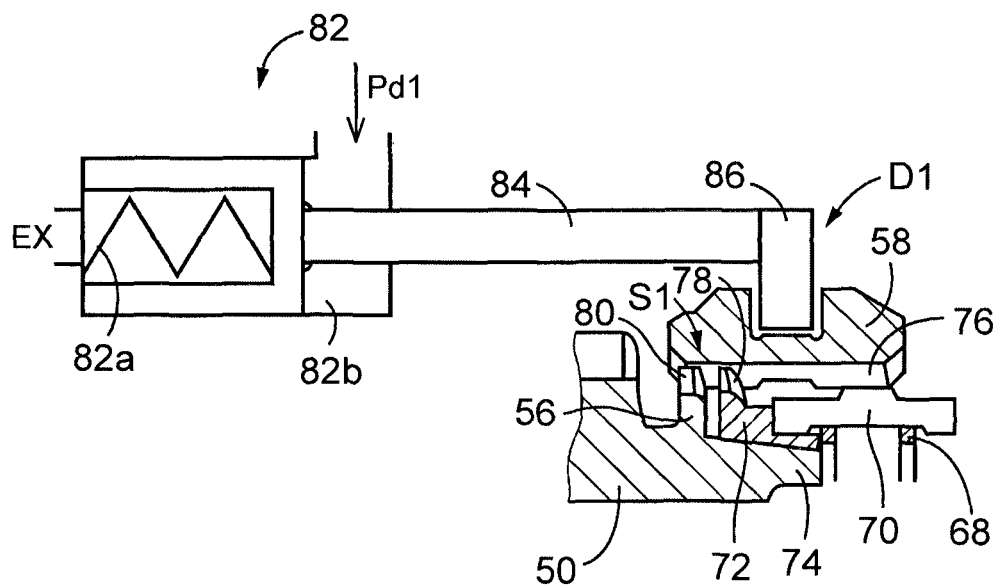
FIG. 4 is a view for illustrating how the intermesh clutch is changed between the engaged state and the released state, and shows a state where the intermesh clutch is engaged.

FIG. 3 and FIG. 4 both are views for illustrating how the dog clutch D1 is changed between an engaged state and a released state. FIG. 3 shows a state where the dog clutch D1 is released. FIG. 4 shows a state where the dog clutch D1 is engaged. As shown in FIG. 3 and FIG. 4, the synchromesh mechanism Si includes a key spring 68, a shifting key 70, a synchronizer ring 72 and a cone portion 74. The shifting key 70 is engaged with the sleeve 58 by the key spring 68. The synchronizer ring 72 is rotated together with the shifting key 70 with a predetermined play. The cone portion 74 is provided on the clutch gear 56. Spline teeth 76 are provided on the inner periphery of the sleeve 58. The spline teeth 76 are spline-fitted to the clutch hub 54. When the sleeve 58 is moved from the released position shown in FIG. 3 toward the clutch gear 56 (in the arrow AR direction in FIG. 3), the synchronizer ring 72 is pressed against the cone portion 74 via the shifting key 70, and power is transmitted to the clutch gear 56 by friction therebetween. When the sleeve 58 is further moved toward the clutch gear 56, the spline teeth 76 are meshed with the spline teeth 78 provided on the synchronizer ring 72 and the spline teeth 80 provided on the clutch gear 56, as shown in FIG. 4. Thus, the clutch hub 54 and the clutch gear 56 are integrally connected, and the power transmission path is established between the forward/reverse switching device 26 and the output shaft 30.

As shown in FIG. 3 and FIG. 4, the power transmission system 16 includes the hydraulic actuator 82 that is operated to engage or release the dog clutch D1. In the dog clutch D1, a pressing force that presses the sleeve 58 toward the releasing side (see FIG. 3) constantly acts on the sleeve 58 via a fork shaft 84 and a shift fork 86 by the urging force of a return spring $82a$ of the hydraulic actuator 82. A hydraulic pressure Pd1 is regulated as a source pressure by a hydraulic control circuit 88 (see FIG. 5) by using a hydraulic pressure, which is generated by the oil pump 42 that is driven by the engine 12 to rotate. When the hydraulic pressure Pd1 is supplied to an oil chamber $82b$ of the hydraulic actuator 82, the hydraulic actuator 82 is operated. As a result, a pressing force against the urging force of the return spring $82a$ is generated. The pressing force causes an engagement force for moving the sleeve 58 toward an engaging side (see FIG. 4) against the urging force to act on the sleeve 58 via the fork shaft 84 and the shift fork 86. When the hydraulic pressure Pd1 higher than a predetermined hydraulic pressure A is supplied to the oil chamber $82b$, the sleeve 58 is moved to a position at which the dog clutch D1 is placed in the engaged state. The predetermined hydraulic pressure A is, for example, a lower limit value of the hydraulic pressure Pd1 obtained experimentally or by design and stored in advance (that is, determined in advance) for moving the sleeve 58 to the position at which the dog clutch D1 is placed in the engaged state. The predetermined hydraulic pressure A may be, for example, a value that is changed on the basis of an oil temperature, or the like. In this way, in the dog clutch D1, when the fork shaft 84 is actuated by the hydraulic actuator 82, the sleeve 58 is caused to slide in the direction parallel to the axis of the gear mechanism counter shaft 46 via the shift fork 86 fixed to the fork shaft 84, and the engaged state and the released state are changed.

Figure 5:
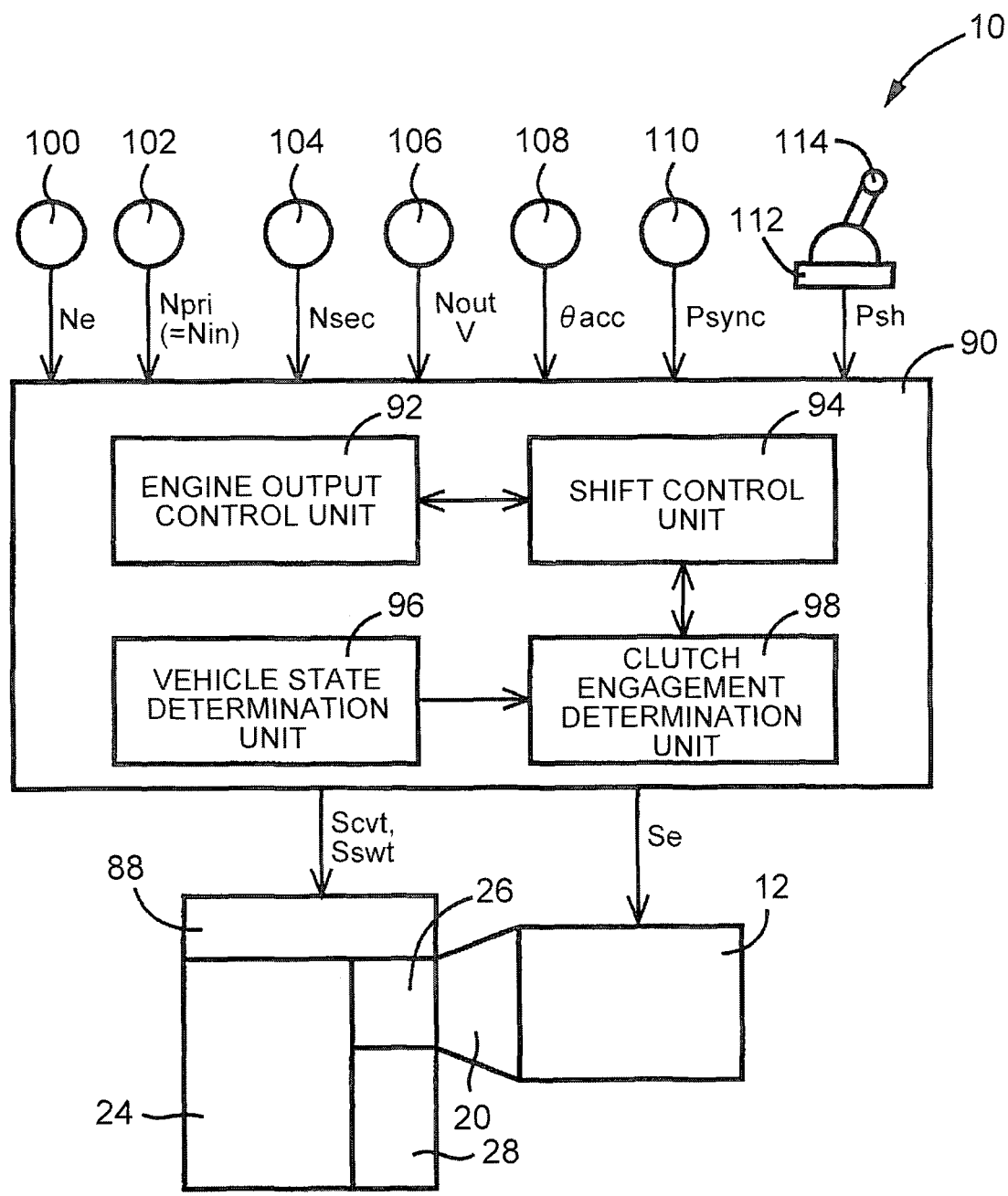
FIG. 5 is a view that illustrates a relevant portion of control functions and control system for various controls in the vehicle shown in FIG. 1.

FIG. 5 is a view that illustrates a relevant portion of control functions and control system for various controls in the vehicle 10. As shown in FIG. 5, the vehicle 10 includes, for example, an electronic control unit 90 including a control apparatus for the power transmission system 16. Thus, FIG. 5 is a view that shows input/output lines of the electronic control unit 90, and is a functional block diagram that illustrates a relevant portion of control functions implemented by the electronic control unit 90. The electronic control unit 90 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 90 is configured to execute output control over the engine 12, shift control over the continuously variable transmission 24, control for changing the driving pattern of the power transmission system 16, and the like. Where necessary, the electronic control unit 90 is split into an electronic control unit for controlling the engine, an electronic control unit for controlling hydraulic pressure, and the like.

Various actual values based on detection signals of various sensors of the vehicle 10 are supplied to the electronic control unit 90. The various sensors include, for example, various rotation speed sensors 100, 102, 104, 106, an accelerator operation amount sensor 108, a stroke sensor 110, a shift position sensor 112, and the like. The various actual values include, for example, an engine rotation speed Ne, a primary pulley rotation speed Npri that is an input shaft rotation speed Nin, a secondary pulley rotation speed Nsec that is a rotation speed of the rotary shaft 62, an output shaft rotation speed Nout corresponding to a vehicle speed V, an accelerator operation amount θacc, a synchromesh position Psync, a shift position (which may also be referred to as shift position or lever position), and the like. The synchromesh position Psync is a movement position of the shift fork 86 (or the fork shaft 84, or the like) corresponding to information about the position of the sleeve 58 between a releasing-side position of the sleeve 58 and an engaging-side position of the sleeve 58. At the releasing-side position of the sleeve 58, the dog clutch D1 is placed in a completely released state. At the engaging-side position of the sleeve 58, the dog clutch D1 is placed in a completely engaged state. The shift position Psh corresponds to information about the position of a shift lever 114 that serves as a shift operating member. An engine output control command signal Se, a hydraulic control command signal Scvt, a hydraulic control command signal Sswt, and the like, are output from the electronic control unit 90. The engine output control command signal Se is used to control the output of the engine 12. The hydraulic control command signal Scvt is used to control hydraulic pressure associated with a shift of the continuously variable transmission 24. The hydraulic control command signal Sswt is used to control the first clutch C1, the first brake B1, the second clutch C2 and the dog clutch D1 associated with a change of the driving pattern of the power transmission system 16. For example, command signals (command hydraulic pressures) for respectively driving solenoid valves that control hydraulic pressures that are supplied to hydraulic actuators of the first clutch C1, the first brake B1, the second clutch C2 and the dog clutch D1 are output to the hydraulic control circuit 88 as the hydraulic control command signal Sswt.

Figure 6:
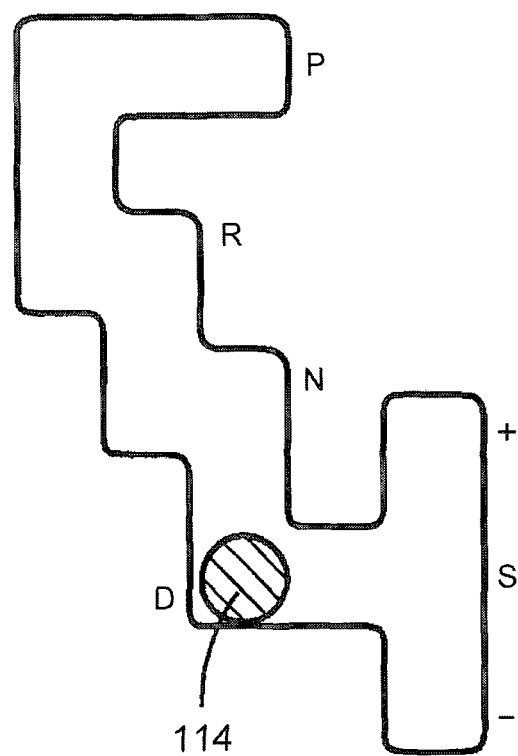
FIG. 6 is a view that shows an example of shift positions of a shift lever of the vehicle.

FIG. 6 is a view that shows an example of the shift positions Psh of the shift lever 114. As shown in FIG. 6, the shift lever 114 has the shift positions Psh of "P", "R", "N", "D" and "S", and is manually operated to any one of the shift positions Psh. The shift position "P" is a parking position P for selecting a parking position (P position) of the power transmission system 16, placing the power transmission system 16 in a neutral state in which the power transmission path is interrupted and mechanically blocking rotation of the output shaft 30. The shift position "R" is a reverse drive position R for selecting a reverse drive position (R position) of the power transmission system 16 and achieving reverse traveling. This reverse drive position R is a drive position at which reverse traveling is enabled by engaging the first brake B1 and the dog clutch D1. The shift position "N" is a neutral position N for selecting a neutral position (N position) of the power transmission system 16 and placing the power transmission system 16 in a neutral state by releasing at least the first clutch C1, the first brake B1 and the second clutch C2. The shift position "D" is a forward drive position D for selecting a forward drive position (D position) of the power transmission system 16 and achieving forward traveling. The forward drive position D is a drive position at which forward traveling is enabled by engaging the first clutch C1 and the dog clutch D1, or engaging the second clutch C2 or engaging the second clutch C2 and the dog clutch D1. The shift position "S" is a manual shift position S for limiting a shift range of the speed ratio γ at the D position of the power transmission system 16. The manual shift position S is a drive position at which a manual shift is enabled by changing multiple types of shift ranges having different shiftable high vehicle speed-side (high-side) speed ratios γ. The shift position "S" has an upshift position "+" and a downshift position "−". The upshift position "+" is used to upshift the shift range each time the shift lever 114 is operated to the upshift position "+". The downshift position "−" is used to downshift the shift range each time the shift lever 114 is operated to the downshift position "−".

The electronic control unit 90 includes an engine output control device, that is, an engine output control unit 92, and a shift control device, that is, a shift control unit 94.

The engine output control unit 92, for example, calculates a required driving force Fdem by applying the accelerator operation amount θacc and the vehicle speed V to a correlation (for example, a driving force map) determined in advance. The engine output control unit 92 sets a target engine torque Tetgt by which the required driving force Fdem is obtained. The engine output control unit 92 outputs, to a throttle actuator, a fuel injection device, an ignition device, and the like, the engine output control command signal Se for output control over the engine 12 such that the target engine torque Tetgt is obtained.

When the engine output control unit 92 begins to start up the engine 12 in the parking position P or the neutral position N during a stop of the vehicle, the shift control unit 94 outputs, to the hydraulic control circuit 88, a command to operate the hydraulic actuator 82 to engage the dog clutch D1 in preparation for the gear drive mode. After that, at the time when the shift lever 114 is shifted into the forward drive position D (or the reverse drive position R), the shift control unit 94 outputs, to the hydraulic control circuit 88, a command to engage the first clutch C1 (or the first brake B1).

In the CVT drive mode, the shift control unit 94 applies the actual accelerator operation amount θacc, the actual vehicle speed V, and the like, to a predetermined correlation (for example, a CVT shift map, a belt clamping force map). By this application, the shift control unit 94 determines a command hydraulic pressure (hydraulic control command signal Scvt) of each of hydraulic pressures respectively supplied to the hydraulic cylinders of the primary pulley 60 and secondary pulley 64 for achieving a target speed ratio γtgt of the continuously variable transmission 24 such that the operating point of the engine 12 is on a predetermined optimal line (for example, an engine optimal fuel consumption line) while a belt slip of the continuously variable transmission 24 does not occur. After that, the shift control unit 94 outputs those command hydraulic pressures to the hydraulic control circuit 88, and carries out a CVT shift.

The shift control unit 94 controls a change of the driving pattern between the gear drive mode and the CVT drive mode. Specifically, for example, the shift control unit 94 determines whether to change the speed ratio on the basis of the vehicle speed V and the accelerator operation amount θacc by using an upshift line and a downshift line with a predetermined hysteresis for changing the speed ratio between the first-speed speed ratio and the second-speed speed ratio. The first-speed speed ratio corresponds to the speed ratio γ1 in the gear drive mode. The second-speed speed ratio corresponds to the maximum speed ratio γmax in the CVT drive mode. The shift control unit 94 changes the driving pattern on the basis of the determined result.

When the shift control unit 94 determines to upshift in the gear drive mode and changes the driving pattern from the gear drive mode to the CVT drive mode (high vehicle speed), the shift control unit 94 initially carries out a CtoC shift to transitionally change the driving pattern from the gear drive mode to the CVT drive mode (intermediate vehicle speed). Thus, the power transmission path in the power transmission system 16 is changed from the first power transmission path PT1 to the second power transmission path PT2. Subsequently, the shift control unit 94 changes the driving pattern from the CVT drive mode (intermediate vehicle speed) to the CVT drive mode (high vehicle speed) by outputting, to the hydraulic control circuit 88, a command to operate the hydraulic actuator 82 to release the dog clutch D1. When the shift control unit 94 determines to downshift in the CVT drive mode (high vehicle speed) and changes the driving pattern from the CVT drive mode (high vehicle speed) to the gear drive mode, the shift control unit 94 initially transitionally changes the driving pattern from the CVT drive mode (high vehicle speed) to the CVT drive mode (intermediate vehicle speed) by outputting, to the hydraulic control circuit 88, a command to operate the hydraulic actuator 82 to engage the dog clutch D1. Subsequently, the shift control unit 94 carries out a CtoC shift to change the driving pattern from the CVT drive mode (intermediate vehicle speed) to the gear drive mode. Thus, the power transmission path in the power transmission system 16 is changed from the second power transmission path PT2 to the first power transmission path PT1. In change control for changing the driving pattern between the gear drive mode and the CVT drive mode, the change is carried out via the CVT drive mode (intermediate vehicle speed) transitionally, so the first power transmission path PT1 and the second power transmission path PT2 are changed only by exchanging torque through a CtoC shift. Therefore, a change shock is suppressed.

When an N-to-D shift for operating the shift lever 114 from the neutral position N to the forward drive position D is performed during a stop of the vehicle, it is desirable to establish the first power transmission path PT1 as early as possible such that the vehicle is allowed to immediately start moving. Incidentally, when an engine startup is carried out in advance of the N-to-D shift, there is a possibility that an engagement operation of the dog clutch D1, which is carried out together with an engine startup, has not completed at the time of the N-to-D shift. When the first power transmission path PT1 is established during a stop of the vehicle, it is required to engage the first clutch C1 in a state where engagement of the dog clutch D1 has completed because of the structure of the dog clutch D1. Therefore, when the dog clutch D1 is not engaged at the time of the N-to-D shift after an engine startup during a stop of the vehicle, there is a possibility that the establishment of the first power transmission path PT1 delays. Aside from this, when the first clutch C1 is released during a stop of the vehicle, rotation of both the input element (for example, the gear mechanism counter shaft 46, the clutch hub 54) of the dog clutch D1 and the output element (for example, the idler gear 50, the clutch gear 56) is stopped. In such a state, depending on the phases of the counterpart members (for example, the spline teeth 76, 78, 80) that mesh at the time of engagement of the dog clutch D1, there is a case where an uplock occurs. In the uplock, the dog clutch D1 is not engaged. The uplock occurs as follows. The tooth tips of the spline teeth 76 contact with (collide with) the tooth tips of the spline teeth 78 or the tooth tips of the spline teeth 80, with the result that the engagement operation of the dog clutch D1 does not proceed. When such an uplock of the dog clutch D1 has occurred, the first power transmission path PT1 is not established. In a P-to-D shift from the parking position P to the forward drive position D, the shift lever 114 is changed to the forward drive position D via the neutral position N, so the P-to-D shift is included in the N-to-D shift in the first embodiment.

When the dog clutch D1 is in a non-engaged state at the time when the shift position Psh of the shift lever 114 has been changed from the neutral position N to the forward drive position D during a stop of the vehicle while the engine 12 is being driven, the shift control unit 94 starts the engagement operation of the second clutch C2 in a state where the first clutch C1 is in a non-engaged state. The shift control unit 94 carries out the engagement operation of the dog clutch D1 while the engagement operation of the second clutch C2 is being carried out. That is, because the shift control unit 94 is not allowed to immediately start the engagement operation of the first clutch C1 when the dog clutch D1 is in the non-engaged state, the shift control unit 94 initially starts the engagement operation of the second clutch C2 to start preparation for establishing the second power transmission path PT2. In this way, a situation that none of the power transmission paths PT is established is avoided, so the startability of the vehicle 10 is ensured. In addition, in order to easily engage the dog clutch D1 by generating differential rotation (phase shift) between the input and output elements of the dog clutch D1, the shift control unit 94 carries out the engagement operation of the second clutch C2. In this way, it is possible to facilitate preparation for transmission of power through the first power transmission path PT1 that is more suitable for a start of the vehicle.

Figure 7:
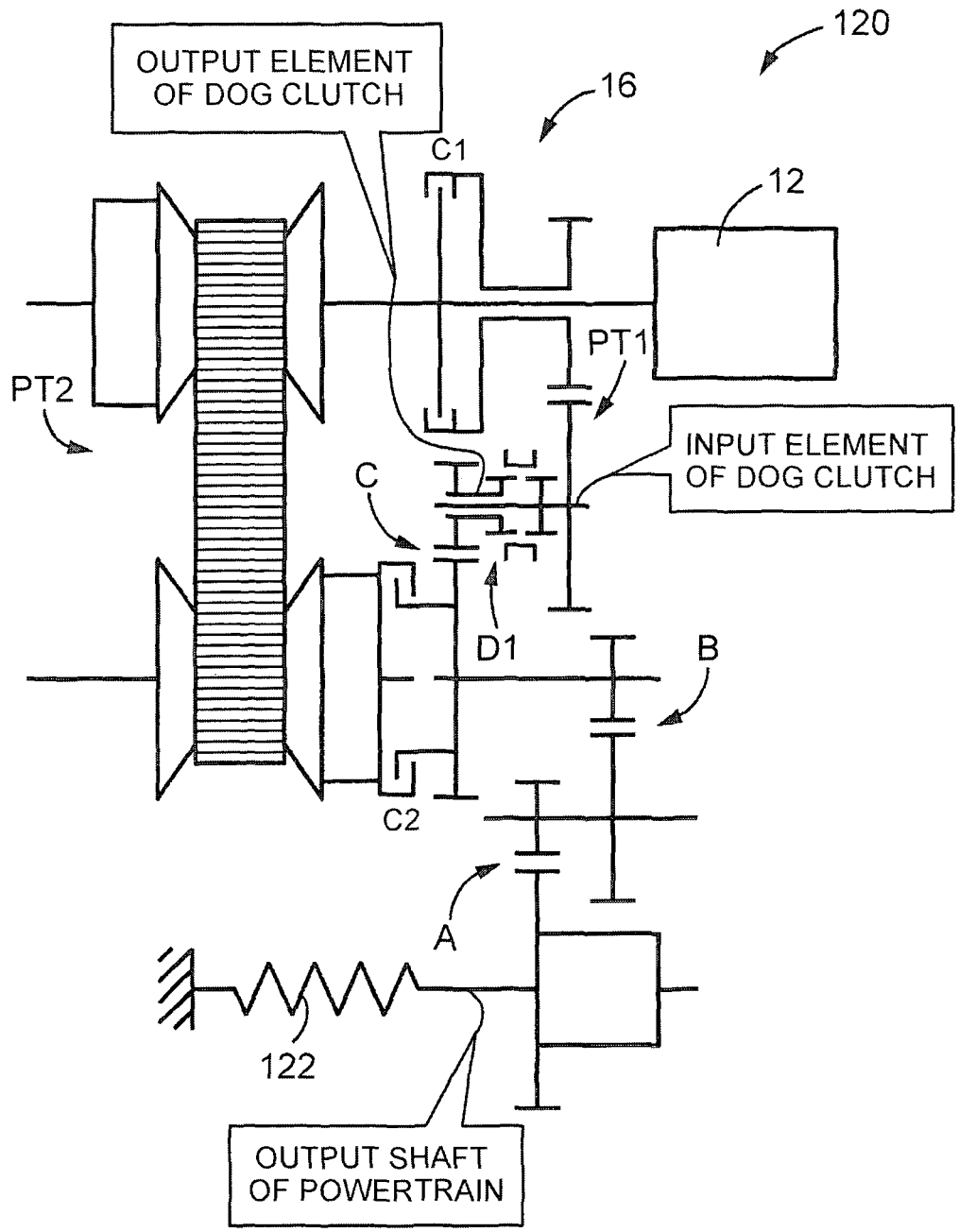
FIG. 7 is a view for illustrating a mechanism of generating differential rotation between input and output elements of the dog clutch by the use of an engagement operation of a second clutch in the power transmission system.
Figure 8:
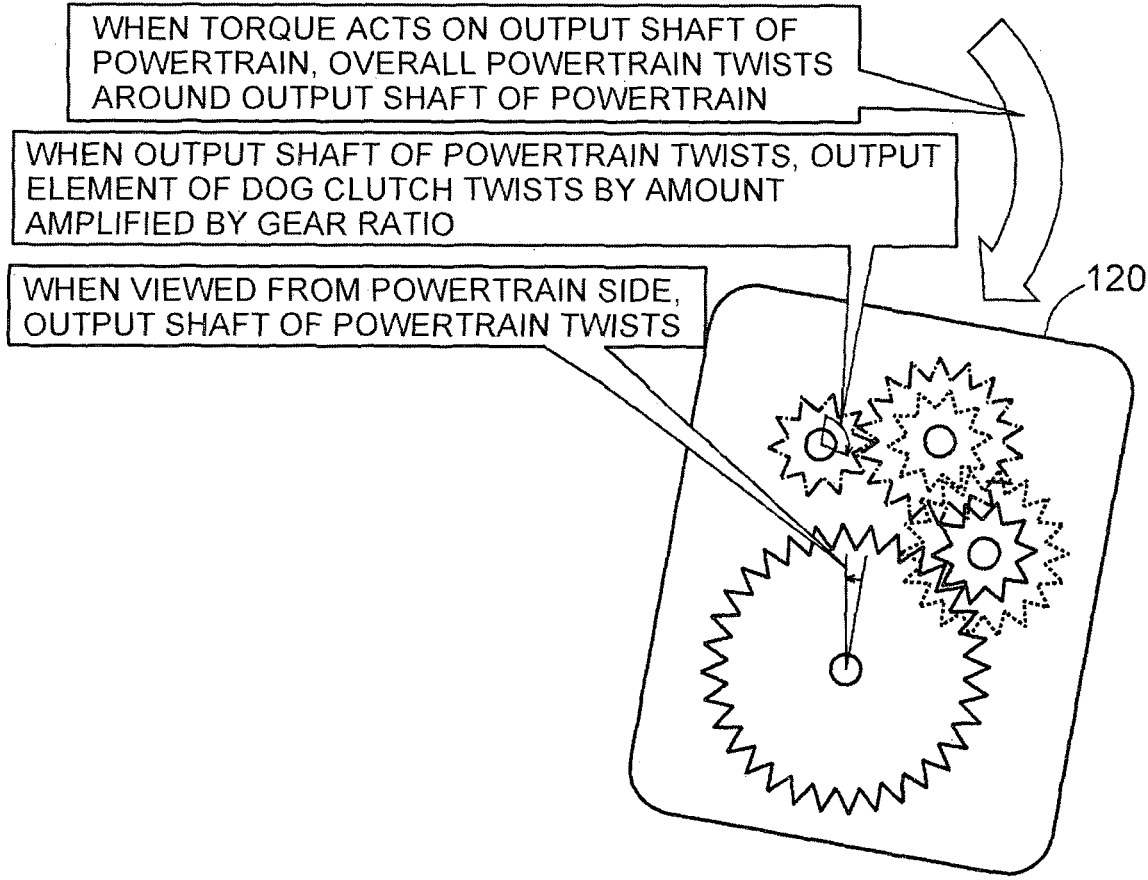
FIG. 8 is a view for illustrating the mechanism of generating differential rotation between the input and output elements of the dog clutch by the use of the engagement operation of the second clutch in combination with FIG. 7.

A mechanism of generating differential rotation between the input and output elements of the dog clutch D1 by the use of the engagement operation of the second clutch C2 will be described below. FIG. 7 and FIG. 8 are views for illustrating the above-described mechanism. FIG. 7 is a simplified view of a powertrain 120 including the engine 12 and the power transmission system 16. FIG. 8 is a view of the powertrain 120 in a state where mechanical coupling from the output shaft (for example, the axles 40) to the output element (for example, the idler gear 50) of the dog clutch D1 is simplified. In FIG. 7 and FIG. 8, the powertrain 120 is flexibly supported by an engine mount, or the like. Therefore, when torque acts on the output shaft of the powertrain 120, the overall powertrain 120 twists around the output shaft accordingly. This means that, when viewed from the powertrain 120 side, a twist has occurred in the output shaft of the powertrain 120. Thus, when the second clutch C2 is engaged, torque acts on the output shaft of the powertrain 120, and the output shaft twists by the amount of a suspension system rigidity 122 of the powertrain 120. On the other hand, the output element of the dog clutch D1 is rigidly coupled to the output shaft of the powertrain 120 by gear pairs (for example, gear pairs A, B, C). Therefore, when the output shaft of the powertrain 120 twists, the output element of the dog clutch D1 is rotated by the amount expressed by Twisted angle of output shaft×Gear ratio. For example, in the case where a total gear ratio of the gear pairs A, B, C is 10, when the output shaft of the powertrain 120 twists by 10[°], the output element of the dog clutch D1 is rotated by 10[°]×10=100[°]. On the other hand, because both the first clutch C1 and the dog clutch D1 are released, the input element (for example, the gear mechanism counter shaft 46) of the dog clutch D1 does not receive a rotation force from anywhere, and is not rotated. Thus, the input element of the dog clutch D1 does not rotate but the output element of the dog clutch D1 rotates because of the twist, so differential rotation (phase shift) is generated between the input and output elements (the counterpart members that mesh at the time of engagement) of the dog clutch D1.

More specifically, referring back to FIG. 5, the electronic control unit 90 further includes a vehicle state determination device, that is, a vehicle state determination unit 96 and a clutch engagement determination unit 98. The vehicle state determination unit 96 determines on the basis of the vehicle speed V and the shift position Psh whether the N-to-D shift has been carried out during a stop of the vehicle.

The clutch engagement determination unit 98, for example, determines on the basis of the synchromesh position Psync whether engagement of the dog clutch D1 has completed (that is, whether the dog clutch D1 is in the engaged state). The clutch engagement determination unit 98, for example, determines that the dog clutch D1 is in the engaged state when the synchromesh position Psync falls within a predetermined range, and determines that the dog clutch D1 is in the non-engaged state when the synchromesh position Psync falls outside the predetermined range. The predetermined range is, for example, a predetermined range of the synchromesh position Psync for determining that the sleeve 58 has moved to the synchromesh position Psync at which the dog clutch D1 is placed in the engaged state. For example, when the shift control unit 94 is carrying out the engagement operation of the dog clutch D1, the clutch engagement determination unit 98 determines on the basis of the synchromesh position Psync whether engagement of the dog clutch D1 has completed.

The clutch engagement determination unit 98, for example, determines whether the engagement operation of the first clutch C1 by the shift control unit 94 has completed. The clutch engagement determination unit 98, for example, determines whether the engagement operation of the second clutch C2 by the shift control unit 94 has completed. The engagement operation of each of the clutches C1, C2 by the shift control unit 94 is, for example, divided into an engagement preparation and an engagement process. The engagement preparation is an engagement operation in which the state of the clutch C1 or clutch C2 is shifted to a predetermined state where the clutch C1 or clutch C2 has no torque capacity. The predetermined state is, for example, a state where packing of the clutch C1 or the clutch C2 has completed, and is a state where the clutch C1 or the clutch C2 begins to have a torque capacity when a corresponding command hydraulic pressure is raised from that state. That is, the predetermined state is a state where a predetermined time or longer has elapsed from the start of an engagement preparation while the engagement preparation in which a command hydraulic pressure for a standby in low pressure after an output of a command hydraulic pressure for rapid filling is being carried out. Therefore, the fact that the clutch C1 or the clutch C2 becomes the predetermined state means that the engagement preparation of the cultch C1 or clutch C2 has completed. On the other hand, the engagement process is an engagement operation for shifting the state of the clutch C1 or clutch C2, of which the engagement preparation has completed, to the engaged state. That is, the engagement process is an engagement operation for engaging the cultch C1 or the clutch C2 by gradually increasing the corresponding command hydraulic pressure from the state where the engagement preparation of the clutch C1 or clutch C2 has completed. Therefore, the fact that engagement of the clutch C1 or clutch C2 has completed means that the engagement process of the clutch C1 or clutch C2 has completed.

The clutch engagement determination unit 98, for example, determines whether the engagement preparation of the first clutch C1 by the shift control unit 94 has completed on the basis of whether a predetermined time A or longer has elapsed from the start of the engagement preparation of the first clutch C1 by the shift control unit 94 while the engagement preparation of the first clutch C1 is being carried out. The clutch engagement determination unit 98, for example, determines whether the engagement preparation of the second clutch C2 by the shift control unit 94 has completed on the basis of whether a predetermined time B or longer has elapsed from the start of the engagement preparation of the second clutch C2 by the shift control unit 94 while the engagement preparation of the second clutch C2 is being carried out. Each of the predetermined times A, B is, for example, a predetermined lower limit value of a time from the start of output of a command hydraulic pressure for the engagement preparation for allowing to determine that a corresponding one of the clutches C1, C2 is set to the predetermined state by the command hydraulic pressure.

The clutch engagement determination unit 98, for example, determines whether engagement of the first clutch C1 has completed on the basis of whether a rotation speed (for example, the input shaft rotation speed Nin) of a predetermined rotating member becomes a rotation speed after a change resulting from engagement of the first clutch C1 while the engagement process of the first clutch C1, by the shift control unit 94 is being carried out. The clutch engagement determination unit 98, for example, determines whether engagement of the second clutch C2 has completed on the basis of whether the rotation speed (for example, the input shaft rotation speed Nin) of the predetermined rotating member becomes the rotation speed after a change resulting from engagement of the second clutch C2 while the engagement process of the second clutch C2 by the shift control unit 94 is being carried out. The input shaft rotation speed Nin after a change resulting from engagement of the clutch C1 or clutch C2 is, for example, zero during a stop of the vehicle, and whether engagement of the cultch C1 or cultch C2 has completed is determined on the basis of whether an actual value after the change based on a detected signal of the rotation speed sensor 102 is zero. The engagement process of the first clutch C1 is predicated on completion of engagement of the dog clutch D1.

When the vehicle state determination unit 96 determines that the N-to-D shift has been carried out during a stop of the vehicle, and when the clutch engagement determination unit 98 determines that the dog clutch D1 is not in the engaged state (that is, in the non-engaged state), the shift control unit 94 starts the engagement operation (particularly, the engagement preparation) of the second clutch C2 while the first clutch C1 is placed in the non-engaged state. The shift control unit 94 carries out the engagement operation of the dog clutch D1 while the engagement operation (particularly, the engagement preparation) of the second clutch C2 is being carried out. That is, the shift control unit 94 continuously carries out the already started engagement operation of the dog clutch D1 or starts the engagement operation of the dog clutch D1. On the other hand, when the vehicle state determination unit 96 determines that the N-to-D shift has been carried out during a stop of the vehicle, and when the clutch engagement determination unit 98 determines that the dog clutch D1 is in the engaged state, the shift control unit 94 starts (carries out) the engagement operation of the first clutch C1. In the engagement operation of the first clutch C1, the engagement preparation of the first clutch C1 is started, the engagement process of the first clutch C1 is started when it is determined that the first clutch C1 is placed in the predetermined state while the engagement preparation is being carried out, and the first clutch C1 is engaged by carrying out the engagement process.

When the clutch engagement determination unit 98 determines that engagement of the dog clutch D1 has completed while the engagement operation of the second clutch C2 is being carried out, the shift control unit 94 stops the engagement operation of the second clutch C2, releases the second clutch C2 by carrying out the releasing operation (releasing process) of the second clutch C2, and engaging the first clutch C1 by carrying out the engagement operation of the first clutch C1. Particularly, while the engagement preparation of the second clutch C2 is being carried out, when the clutch engagement determination unit 98 determines that engagement of the dog clutch D1 has completed before the clutch engagement determination unit 98 determines that the second clutch C2 is placed in the predetermined state, the shift control unit 94 stops the engagement preparation of the second clutch C2, releases the second clutch C2, and engages the first clutch C1. In this case, because the second clutch C2 does not have a torque capacity yet, it is not required to change the engaged clutch (that is, exchange torque) as in the case of a CtoC shift at the time of engagement of the first clutch C1, so control is further simple. When the clutch engagement determination unit 98 determines that engagement of the dog clutch D1 has completed while the engagement process of the second clutch C2 is being carried out, the shift control unit 94 stops the engagement process of the second clutch C2, releases the second clutch C2, and engages the first clutch C1. In this case, because the second clutch C2 already has a torque capacity, control for changing the engaged clutch as in the case of a CtoC shift is executed at the time of engaging the first clutch C1.

The shift control unit 94 starts the engagement operation (particularly, the engagement preparation) of the first clutch C1 while the engagement operation of the second clutch C2 is being carried out, and keeps the first clutch C1 in the predetermined state. This is because, in the above-described engagement operation of the first clutch C1 that is carried out after completion of engagement of the dog clutch D1, the engagement process, of the first clutch C1 is quickly started and the first clutch C1 is engaged. Particularly, when the clutch engagement determination unit 98 determines that the second clutch C2 is placed in the predetermined state while the engagement preparation of the second clutch C2 is being carried out, the shift control unit 94 starts the engagement preparation of the first clutch C1 and the engagement process of the second clutch C2. This is because, when the engagement preparation of the first clutch C1 and the engagement preparation of the second clutch C2 are carried out in parallel at the same time, there is a possibility that it takes time to carry out the engagement preparation of the second clutch C2 and, as a result, the establishment of the second power transmission path PT2 delays.

While the engagement preparation of the first clutch C1 is being carried out, when the clutch engagement determination unit 98 determines that engagement of the second clutch C2 has completed before the clutch engagement determination unit 98 determines that the first clutch C1 is placed in the predetermined state, the shift control unit 94 keeps the engagement of the second clutch C2 while the first clutch C1 is placed in the non-engaged state. When the clutch engagement determination unit 98 determines that engagement of the second clutch C2 has completed before the clutch engagement determination unit 98 determines that engagement of the dog clutch D1 has completed, the shift control unit 94 keeps the engagement of the second clutch C2 while the first clutch C1 is placed in the non-engaged state. That is, when the engagement preparation of the first clutch C1 or engagement of the dog clutch D1 has not completed by the time engagement of the second clutch C2 completes, a change of the power transmission path from the second power transmission path PT2 to the first power transmission path PT1 is cancelled. A higher priority is given to preparation for a start of the vehicle with the use of the second power transmission path PT2. When a change into the first power transmission path PT1 is cancelled, the shift control unit 94, for example, stops the engagement preparation of the first clutch C1, and proceeds to the releasing process of the first clutch C1.

Figure 9:
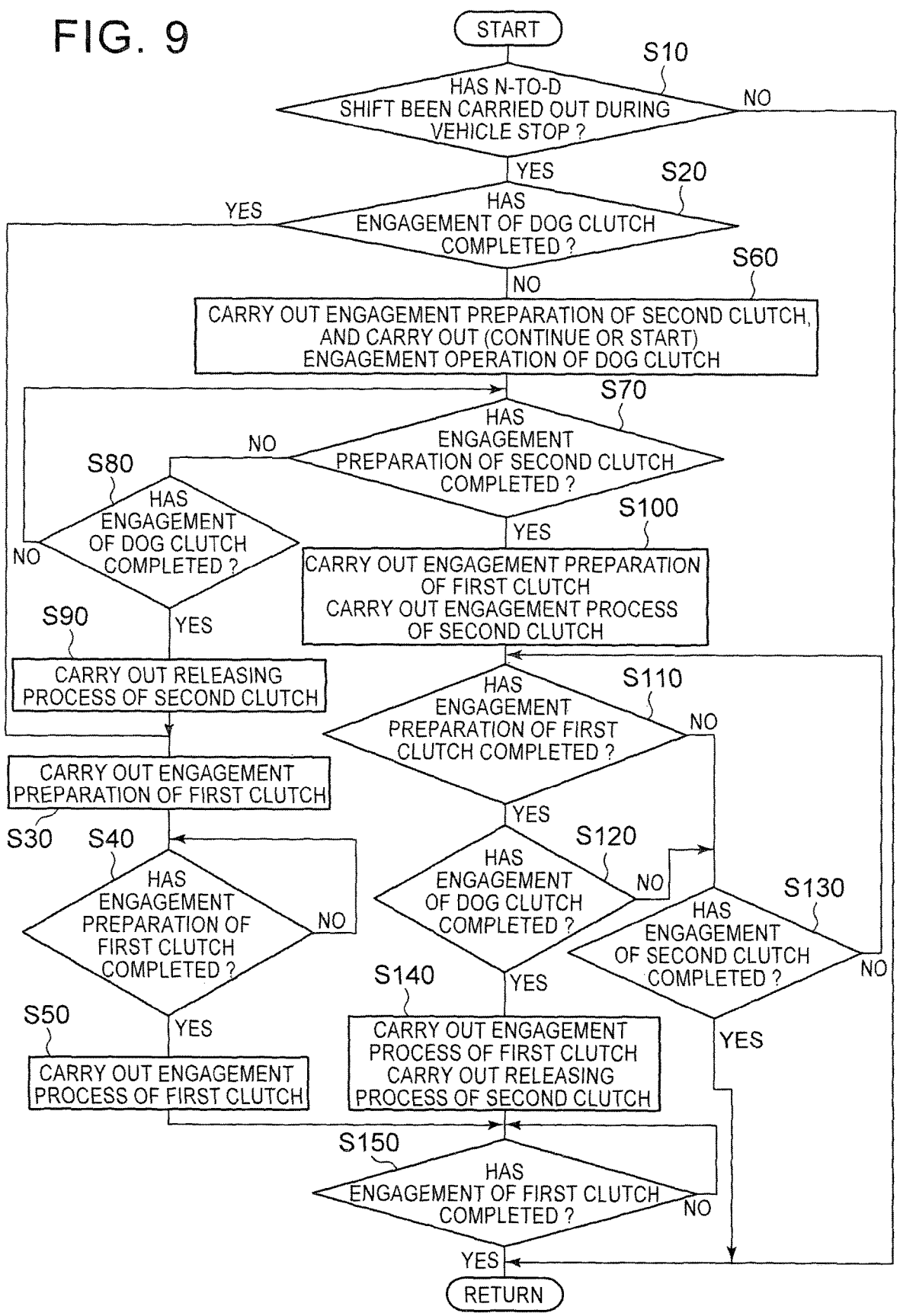
FIG. 9 is a flowchart that illustrates a relevant portion of control operations of an electronic control unit provided in the control apparatus for the power transmission system, that is, control operations for ensuring the startability of the vehicle in the case where the dog clutch is in a non-engaged state at the time of an N-to-D shift during a stop of the vehicle.
Figure 10:
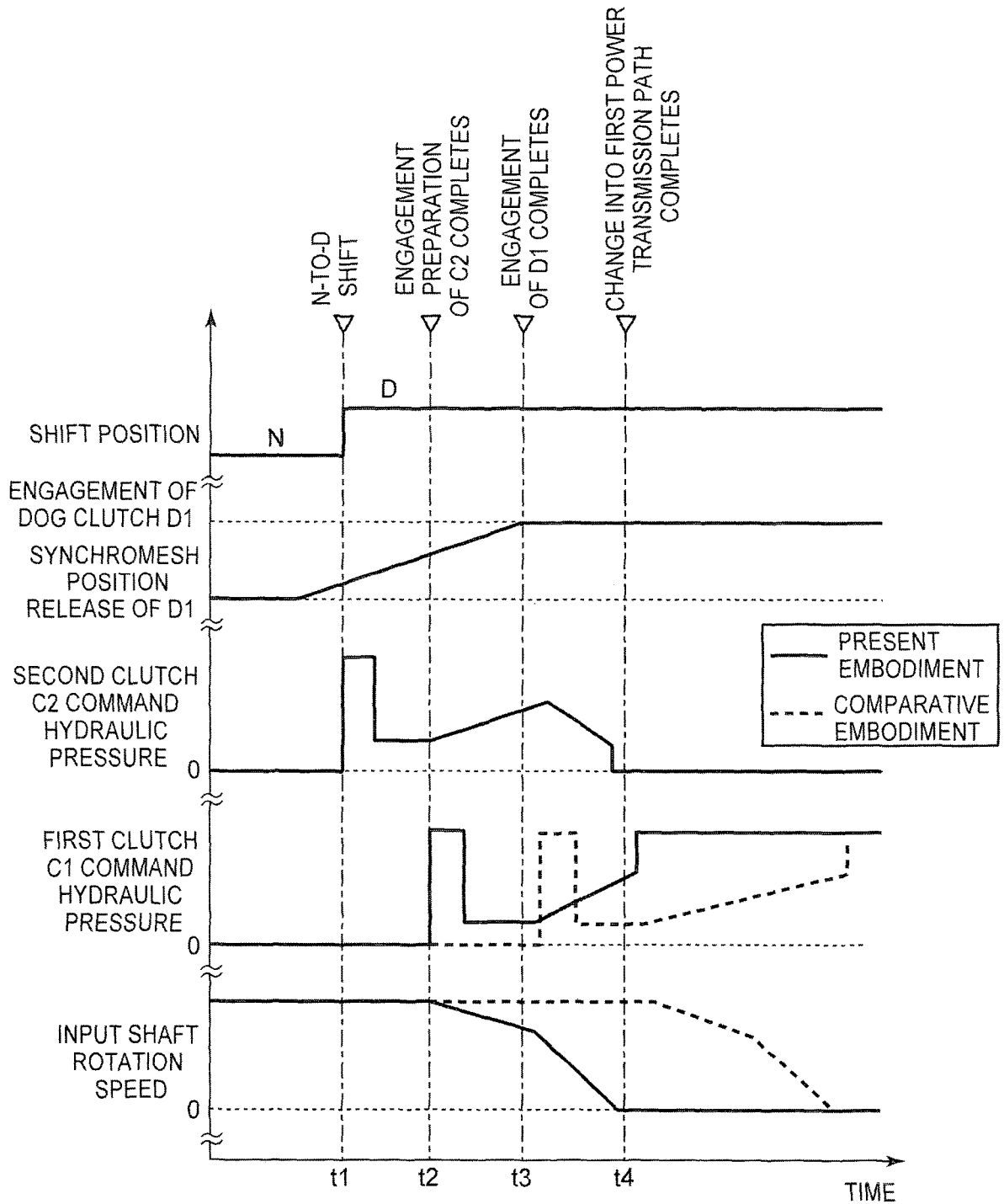
FIG. 10 is an example of a time chart in the case where the control operations shown in the flowchart of FIG. 9 are executed.

FIG. 9 is a flowchart that shows a relevant portion of control operations of the electronic control unit 90, that is, control operations for ensuring the startability of the vehicle 10 in the case where the dog clutch D1 is in the non-engaged state at the time of the N-to-D shift during a stop of the vehicle. In this flowchart, for example, the control operations are repeatedly executed. FIG. 10 is an example of a time chart in the case where the control operations shown in the flowchart of FIG. 9 are executed.

In FIG. 9, initially, in step (hereinafter, step is omitted) S10 corresponding to the vehicle state determination unit 96, for example, it is determined whether the N-to-D shift has been carried out during a stop of the vehicle. When negative determination is made in S10, the routine is ended. When affirmative determination is made in S10, for example, in S20 corresponding to the clutch engagement determination unit 98, it is determined whether engagement of the dog clutch D1 has completed. When affirmative determination is made in S20, for example, in S30 corresponding to the shift control unit 94, the engagement preparation of the first clutch C1 is started (carried out). Subsequently, for example, in S40 corresponding to the clutch engagement determination unit 98, it is determined whether the engagement preparation of the first clutch C1 has completed. When negative determination is made in S40, S40 is repeatedly executed. When affirmative determination is made in S40, for example, in S50 corresponding to the shift control unit 94, the engagement process of the first clutch C1 is started (carried out). On the other hand, when negative determination is made in S20, for example, in S60 corresponding to the shift control unit 94, the engagement preparation of the second clutch C2 is started (carried out) (see t1 timing in FIG. 10). While the engagement preparation of the second clutch C2 is being carried out, the engagement operation of the dog clutch D1 is carried out. Subsequently, for example, in S70 corresponding to the clutch engagement determination unit 98, it is determined whether the engagement preparation of the second clutch C2 has completed. When negative determination is made in S70, for example, in S80 corresponding to the clutch engagement determination unit 98, it is determined whether engagement of the dog clutch D1 has completed. When negative determination is made in S80, the process is returned to S70. When affirmative determination is made in S80, for example, in S90 corresponding to the shift control unit 94, the releasing process of the second clutch C2 is started (carried out). Subsequently, S30 and the following steps are executed. When affirmative determination is made in S70, for example, in S100 corresponding to the shift control unit 94, the engagement preparation of the first clutch C1 is started (carried out), and the engagement process of the second clutch C2 is started (carried out) (see t2 timing in FIG. 10). Subsequently, for example, in S110 corresponding to the clutch engagement determination unit 98, it is determined whether the engagement preparation of the first clutch C1 has completed. When affirmative determination is made in S110, for example, in S120 corresponding to the clutch engagement determination unit 98, it is determined whether engagement of the dog clutch D1 has completed. When negative determination is made in S110 or when negative determination is made in S120, for example, in S130 corresponding to the clutch engagement determination unit 98, it is determined whether engagement of the second clutch C2 has completed. When negative determination is made in S130, the process is returned to S110. When affirmative determination is made in S130, the routine is ended.

When affirmative determination is made in S120, for example, in S140 corresponding to the shift control unit 94, the engagement process of the first clutch C1 is started (carried out), and the releasing process of the second clutch C2 is started (carried out) (see t3 timing in FIG. 10). Subsequent to S50 or subsequent to S140, for example, in S150 corresponding to the clutch engagement determination unit 98, it is determined whether engagement of the first clutch C1 has completed. When negative determination is made in S150, S150 is repeatedly executed. When affirmative determination is made in S150, the routine is ended (see t4 timing in FIG. 10).

In FIG. 10, t1 timing indicates that the N-to-D shift has been carried out during a stop of the vehicle. Because engagement of the dog clutch D1 has not completed yet at t1 timing, the engagement preparation of the second clutch C2 is started. When the engagement preparation of the second clutch C2 has completed at t2 timing, the engagement process of the second clutch C2 is started, and the engagement preparation of the first clutch C1 is started. The engagement preparation of the first clutch C1 may be started while the engagement preparation of the second clutch C2 is being carried out (including the timing of the start of the engagement preparation). While the engagement operation (engagement preparation and engagement process) of the second clutch C2 is being carried out, the engagement operation of the dog clutch D1 is carried out. This is because of an intention to complete the engagement operation of the dog clutch D1 during a situation that an uplock is hard to occur because of differential rotation generated between the input and output elements of the dog clutch D1. In this first embodiment, for example, the engagement operation of the dog clutch D1 is started as a result of an engine startup before the N-to-D shift, so the engagement operation of the dog clutch D1 is continuously carried out while the engagement operation of the second clutch C2 is being carried out.

When engagement of the dog clutch D1 completes at t3 timing, for example, the engagement process of the first clutch C1 and the releasing process of the second clutch C2 are coordinately carried out as in the case of a CtoC shift, and the power transmission path is changed from the second power transmission path PT2 to the first power transmission path PT1. In a comparative embodiment indicated by the dashed line, the engagement preparation of the first clutch C1 is started after completion of engagement of the dog clutch D1. In contrast, in the first embodiment, the engagement preparation of the first clutch C1 is started while the engagement operation of the second clutch C2 is being carried out (when viewed in a different way, while the engagement operation of the dog clutch D1 is being carried out). Thus, in the first embodiment, as compared to the comparative embodiment, a time from the timing of the N-to-D shift to occurrence of a behavior (for example, to when the input shaft rotation speed Ni begins to decrease) is shorter, so the responsiveness is improved.

As described above, according to the first embodiment, while the engagement operation of the second clutch C2 is being carried out, that is, during a situation that an uplock is hard to occur because of a phase shift generated between meshing counterpart members of the dog clutch D1, the engagement operation of the dog clutch D1 is carried out. Because the engagement operation is carried out, the dog clutch D1 is easily engaged, and it is possible to facilitate preparation for transmission of power through the first power transmission path PT1. If the dog clutch D1 is not engaged, the second clutch C2 is engaged and the second power transmission path PT2 is established, so it is possible to start moving the vehicle 10 by transmitting power through the second power transmission path PT2. Thus, when the dog clutch D1 is in the non-engaged state (that is, when preparation for transmission of power through the first power transmission path PT1 has not completed) at the time of the N-to-D shift during a stop of the vehicle, it is possible to ensure the startability of the vehicle 10.

According to the first embodiment, when engagement of the dog clutch D1 has completed while the engagement operation of the second clutch C2 is being carried out, the second clutch C2 is released, and the first clutch C1 is engaged. Therefore, it is possible to start moving the vehicle 10 by transmitting power through the first power transmission path PT1 having a relatively large speed ratio γ. Thus, it is possible to further ensure the startability of the vehicle 10.

According to the first embodiment, because the engagement operation of the first clutch C1 is started while the engagement operation of the second clutch C2 is being carried out, and the first clutch C1 is kept in the predetermined state where the first clutch C1 has no torque capacity, the power transmission path is quickly changed from the second power transmission path PT2 to the first power transmission path PT1 by releasing the second clutch C2 and engaging the first clutch C1.

According to the first embodiment, when the second clutch C2 is placed in the predetermined state where the second clutch C2 has no torque capacity while the engagement operation of the second clutch C2 is being carried out, the engagement operation of the first clutch C1 is started, so the second clutch C2 is quickly placed in the predetermined state where the second clutch C2 has no torque capacity.

According to the first embodiment, when engagement of the dog clutch D1 has completed before reaching the predetermined state where the second clutch C2 has no torque capacity while the engagement operation of the second clutch C2 is being carried out, the second clutch C2 is released, and the first clutch C1 is engaged. Therefore, the second clutch C2 having no torque capacity just needs to be released, and the first clutch C1 just needs to be engaged. Thus, it is possible to reduce the frequency of changing the engaged clutch, which is difficult control for engaging the first clutch C1 while releasing the second clutch C2 having a torque capacity.

According to the first embodiment, when engagement of the second clutch C2 has completed before reaching the predetermined state where the first clutch C1 has no torque capacity, the engagement of the second clutch C2 is kept while the first clutch C1 is in the non-engaged state. When engagement of the second clutch C2 has completed before engagement of the dog clutch D1 completes, the engagement of the second clutch C2 is kept while the first clutch C1 is in the non-engaged state. Thus, after the second power transmission path PT2 has been established, no change of the power transmission path from the second power transmission path PT2 to the first power transmission path PT1 is carried out, so it is possible to suppress a delay of ensuring the startability of the vehicle 10.

Next, a second embodiment of the invention will be described. In the following description, like reference numerals denote portions common to those in the first embodiment, and the description thereof is omitted.

In the above-described first embodiment, while the engagement preparation of the second clutch C2 is being carried out, when the clutch engagement determination unit 98 determines that engagement of the dog clutch D1 has completed before the clutch engagement determination unit 98 determines that the second clutch C2 is placed in the predetermined state, the shift control unit 94 stops the engagement preparation of the second clutch C2, releases the second clutch C2, and engages the first clutch C1. In contrast, in the second embodiment, even when the clutch engagement determination unit 98 determines that the second clutch C2 is not placed in the predetermined state yet while the engagement preparation of the second clutch C2 is being carried out, the clutch engagement determination unit 98 does not determine whether engagement of the dog clutch D1 has completed. Therefore, when the engagement preparation of the second clutch D2 is stared, the shift control unit 94 carries out the engagement preparation of the second clutch C2 at least until reaching the predetermined state where the second clutch C2 has no torque capacity.

Figure 11:
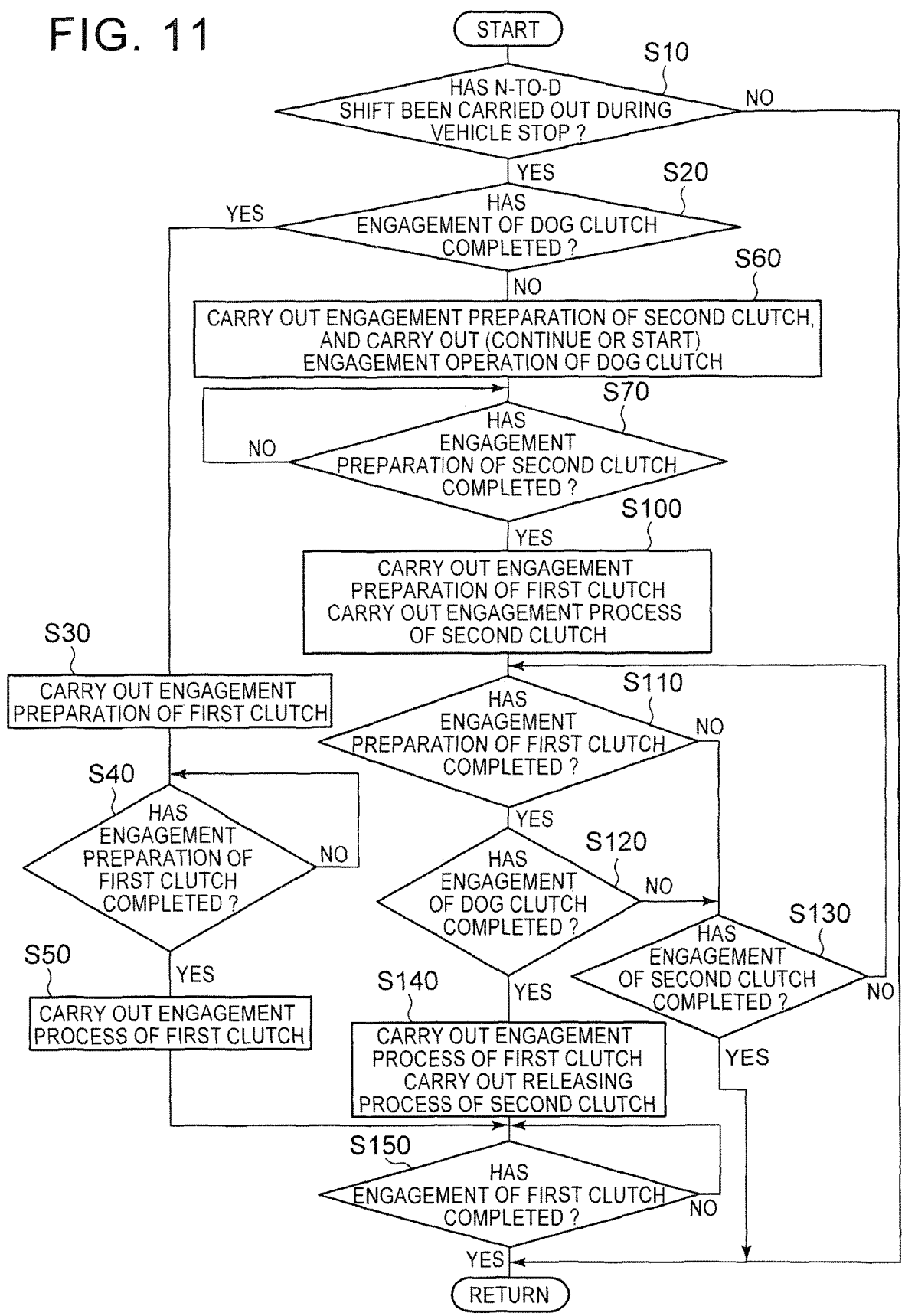
FIG. 11 is a flowchart that shows control operations different from the control operations shown in FIG. 9, and is a flowchart that illustrates control operations according to a second embodiment of the invention, the flowchart illustrating a relevant portion of control operations of the electronic control unit, that is, control operations for ensuring the startability of the vehicle in the case where the dog clutch is in a non-engaged state at the time of an N-to-D shift during a stop of the vehicle.

FIG. 11 is a flowchart that shows a relevant portion of control operations of the electronic control unit 90, that is, control operations for ensuring the startability of the vehicle 10 in the case where the dog clutch D1 is in the non-engaged state at the time of the N-to-D shift during a stop of the vehicle. In this flowchart, for example, the control operations are repeatedly executed. The control operations shown in FIG. 11 that shows the flowchart according to the second embodiment are different from the control operations shown in FIG. 9 that shows the flowchart according to the first embodiment. Hereinafter, the difference between FIG. 11 and FIG. 9 will be described, and the overlap description is omitted.

In FIG. 9, when negative determination is made in S70 as to whether the engagement preparation of the second clutch C2 has completed, it is determined in S80 whether engagement of the dog clutch D1 has completed. In contrast, in FIG. 11, S80 is not executed, and, when negative determination is made in S70, S70 is repeatedly executed. Therefore, in FIG. 11, S80 and S90 in FIG. 9 are not provided. In FIG. 11, when negative determination is made in S20 as to whether engagement of the dog clutch D1 has completed, the process in S100 and the following steps is definitely executed. Thus, the engagement process of the second clutch C2 is definitely carried out when the engagement preparation of the second clutch C2 is started, so it is possible to minimize a time from the timing of the N-to-D shift to occurrence of a behavior, for example, until the input shaft rotation speed Ni begins to decrease. However, S80 and S90 shown in FIG. 9 are not provided, that is, there is no chance to execute control for releasing the second clutch C2 having no torque capacity and engaging the first clutch C1, so, as compared to the above-described first embodiment, the executing rate of changing the engaged clutch by engaging the first clutch C1 and releasing the second clutch C2 having a torque capacity, which is executed in S140, increases.

As described above, according to the second embodiment, when the engagement operation of the second clutch C2 is started, the engagement operation of the second clutch C2 is carried out at least until reaching the predetermined state where the second clutch C2 has no torque capacity, so the second clutch C2 is definitely placed in the predetermined state having no torque capacity, and, after the second clutch C2 is placed in the predetermined state, the second clutch C2 is engaged or the engaged clutch is changed by releasing the second clutch C2 and engaging the first clutch C1. Thus, it is possible to suppress a time from the N-to-D shift to the establishment of the second power transmission path PT2 or the first power transmission path PT1.

The embodiments of the invention are described in detail with reference to the accompanying drawings; however, the invention is also applied to other embodiments.

For example, in the above-described first and second embodiments, the clutch engagement determination unit 98 determines whether engagement of the clutch C1 or the clutch C2 has completed on the basis of whether the rotation speed of the predetermined rotating member becomes the rotation speed after a change resulting from engagement of the clutch C1 or clutch C2 while the engagement process of a corresponding one of the clutches C1, C2 is being carried out. However, the invention is not limited to this configuration. For example, the clutch engagement determination unit 98 may determine whether engagement of the clutch C1 or clutch C2 has completed on the basis of whether a predetermined engagement process time or longer has elapsed from the start of the engagement process while the engagement process of a corresponding one of the clutches C1, C2 is being carried out. The predetermined engagement process time is, for example, a predetermined lower limit value of a time from the start of output of a command hydraulic pressure of the engagement process for allowing to determine that the clutch C1 or the clutch C2 is placed in the engaged state by the command hydraulic pressure.

In FIG. 9 according to the above-described first embodiment or in FIG. 11 according to the above-described second embodiment, determination in S20, or the like, as to whether the dog clutch D1 is engaged may be determination as to whether the synchromesh mechanism S1 is coupled, for example, whether the spline teeth 76 of the sleeve 58 are meshed with the spline teeth 78 of the synchronizer ring 72. The engagement preparation of the first clutch C1 in S100 may be carried out in S60. In this case, S40 is executed subsequent to S90. S110 and S120 may be executed in inverse order. In this way, steps may be changed as needed without any difficulty.

In the above-described first and second embodiments, the gear mechanism 28 is the gear mechanism that establishes one speed stage having a speed ratio lower than the maximum speed ratio γmax of the continuously variable transmission 24; however, the gear mechanism 28 is not limited to this configuration. For example, the gear mechanism 28 may be a gear mechanism in which a plurality of speed stages having different speed ratios γ are established. That is, the gear mechanism 28 may be a stepped transmission that is shifted into two or more stages. For example, the gear mechanism 28 may be a gear mechanism that establishes a speed ratio higher than the minimum speed ratio γmin of the continuously variable transmission 24 and a speed ratio lower than the maximum speed ratio γmax.

In the above-described first and second embodiments, the power transmission system 16 includes the first power transmission path PT1 through the gear mechanism 28 and the second power transmission path PT2 through the continuously variable transmission 24, and the speed ratio γ1 that is established by the first power transmission path PT1 is set to a value larger than the maximum speed ratio γmax that is established by the second power transmission path PT2; however, the invention is not limited to this configuration. For example, the continuously variable transmission 24 may be a gear mechanism having a plurality of speed stages with different speed ratios. The power transmission system 16 may include another power transmission path PT in addition to the first power transmission path PT1 and the second power transmission path PT2. The speed ratio that is established by the second power transmission path PT2 may be set to a value larger than the maximum speed ratio that is established by the first power transmission path PT1. In short, as long as at least the first power transmission path PT1 that is established when the dog clutch D1 and the first clutch C1 provided on the input shaft 22 side with respect to the dog clutch D1 are engaged and the second power transmission path PT2 that is established when the second clutch C2 is engaged are provided between the input shaft 22 and the output shaft 30 in parallel with each other in the power transmission system 16, the invention is applicable.

In the above-described first and second embodiments, the driving pattern of the power transmission system 16 is changed by using the predetermined shift map; however, the invention is not limited to this configuration. For example, the driving pattern of the power transmission system 16 may be changed by calculating a driver's driving request amount (for example, required torque) on the basis of the vehicle speed V and the accelerator operation amount θacc and then setting a speed ratio that satisfies the required torque.

In the above-described first and second embodiments, the engine 12 is illustrated as the driving force source; however, the invention is not limited to this configuration. For example, another prime mover, such as an electric motor, may be employed solely or in combination with the engine 12 as the driving force source. The power of the engine 12 is transmitted to the input shaft 22 via the torque converter 20; however, the invention is not limited. For example, instead of the torque converter 20, another fluid transmission device, such as a fluid coupling having no torque amplification function, may be used. Alternatively, the fluid transmission device is not necessarily provided. The dog clutch D1 includes the synchromesh mechanism S1; however, the synchromesh mechanism S1 does not need to be provided. The shift position "S" may be a manual shift position S for changing the speed ratio of the continuously variable transmission 24 in response to operation of the shift lever 114 or may not be necessarily provided.

The above-described embodiments are only illustrative, and the invention may be implemented in modes including various modifications or improvements on the basis of the knowledge of persons skilled in the art.

What is claimed is:

1. A control apparatus for a power transmission system, the power transmission system including at least a first power transmission path and a second power transmission path provided in parallel with each other between an input rotating member, to which power of a driving force source is transmitted, and an output rotating member that outputs the power to a drive wheel, the first power transmission path being established when an intermesh clutch and a first friction clutch provided on the input rotating member side with respect to the intermesh clutch are engaged, and the second power transmission path being established when a second friction clutch is engaged, the control apparatus comprising:
   an electronic control unit configured to: during a stop of a vehicle while the driving force source is being driven, in response to determining that the intermesh clutch is in a non-engaged state at a time when a shift position of a shift operating member is changed from a neutral position to a forward drive position,
   (i) start an engagement operation of the second friction clutch while the first friction clutch is in a non-engaged state, and
   (ii) carry out an engagement operation of the intermesh clutch while the engagement operation of the second friction clutch is being carried out.

2. The control apparatus according to claim 1, wherein the electronic control unit is configured to: when engagement of the intermesh clutch has completed while the engagement operation of the second friction clutch is being carried out,
   (i) release the second friction clutch, and
   (ii) engage the first friction clutch.

3. The control apparatus according to claim 2, wherein the electronic control unit is configured to:
   (i) start an engagement operation of the first friction clutch while the engagement operation of the second friction clutch is being carried out, and
   (ii) keep the first friction clutch in a predetermined state where the first friction clutch has no torque capacity.

4. The control apparatus according to claim 3, wherein the electronic control unit is configured to, when engagement of the second friction clutch has completed before reaching the predetermined state where the first friction clutch has no torque capacity,
   keep the engagement of the second friction clutch while the first friction clutch is in the non-engaged state.

5. The control apparatus according to claim 3, wherein the electronic control unit is configured to, when reaching a predetermined state where the second friction clutch has no torque capacity while the engagement operation of the second friction clutch is being carried out,
   start the engagement operation of the first friction clutch.

6. The control apparatus according to claim 2, wherein the electronic control unit is configured to: when engagement of the intermesh clutch has completed before reaching a predetermined state where the second friction clutch has no torque capacity while the engagement operation of the second friction clutch is being carried out,
   (i) release the second friction clutch, and
   (ii) engage the first friction clutch.

7. The control apparatus according to claim 1, wherein
the electronic control unit is configured to, when the
engagement operation of the second friction clutch has
been started,
carry out the engagement operation of the second friction
clutch at least until reaching a predetermined state
where the second friction clutch has no torque capacity.

8. The control apparatus according to claim 1, wherein
the electronic control unit is configured to, when engagement of the second friction clutch has completed before engagement of the intermesh clutch completes,
keep the engagement of the second friction clutch while
the first friction clutch is in the non-engaged state.

9. The control apparatus according to claim 1, wherein
the electronic control unit is configured to: during the stop of the vehicle while the driving force source is being driven, in response to determining that the intermesh clutch is in an engaged state at the time when the shift position of the shift operating member is changed from the neutral position to the forward drive position,
carry out an engagement operation of the first friction
clutch without carrying out an engagement operation of
the second friction clutch.

\* \* \* \* \*